(12) United States Patent
Reid et al.

(10) Patent No.: US 8,312,606 B2
(45) Date of Patent: Nov. 20, 2012

(54) EXPANDABLE FASTENER ASSEMBLY WITH DEFORMED COLLAR

(75) Inventors: Leonard Frederick Reid, Issaquah, WA (US); Timothy Howard Johnson, Seattle, WA (US); James Ryunoshin Ross, Seattle, WA (US)

(73) Assignee: Fatigue Technology, Inc., Seattle, WA (US)

( * ) Notice: Subject to any disclaimer, the term of this patent is extended or adjusted under 35 U.S.C. 154(b) by 974 days.

(21) Appl. No.: 12/253,141

(22) Filed: Oct. 16, 2008

(65) Prior Publication Data

US 2009/0178262 A1 Jul. 16, 2009

Related U.S. Application Data

(60) Provisional application No. 60/999,517, filed on Oct. 16, 2007.

(51) Int. Cl.
*F16B 13/06* (2006.01)
*B23P 19/04* (2006.01)

(52) U.S. Cl. .......................... 29/263; 411/361
(58) Field of Classification Search ............ 29/263, 29/525.02, 525.04, 825.02; 411/60.2, 42, 411/43, 82, 361
See application file for complete search history.

(56) References Cited

U.S. PATENT DOCUMENTS

| | | | |
|---|---|---|---|
| 295,593 A | 3/1884 | Thayer | |
| 810,430 A | 1/1906 | Pfluger et al. | |
| 1,081,496 A | 12/1913 | Gilimor | |
| 1,106,964 A | 8/1914 | Pahler | |
| 1,226,090 A | 5/1917 | Ludlum | |
| 1,297,142 A | 3/1919 | Gibbons | |
| 1,480,298 A | 1/1924 | Pearson | |
| 1,881,867 A | 10/1932 | Nelson | |
| 1,979,686 A | 11/1934 | Hall et al. | 85/40 |
| 2,092,358 A | 9/1937 | Robertson | 285/56 |
| 2,146,461 A | 2/1939 | Bettington | 218/29 |
| 2,150,361 A | 3/1939 | Chobert | 153/79 |
| 2,188,596 A | 1/1940 | Hobert | 16/2 |
| 2,275,451 A | 3/1942 | Maxwell | 29/157.5 |
| 2,357,123 A | 8/1944 | Maxwell | 153/80.5 |
| 2,385,294 A | 9/1945 | Lowy | 16/3 |

(Continued)

FOREIGN PATENT DOCUMENTS

DE 2203217 7/1973

(Continued)

OTHER PUBLICATIONS

Merriam Webster's Collegiate Dictionary, Tenth Edition, 1997, p. 154.

(Continued)

*Primary Examiner* — Hadi Shakeri
(74) *Attorney, Agent, or Firm* — Seed IP Law Group PLLC

(57) ABSTRACT

At least one embodiment generally relates to an installation assembly for an opening in a workpiece that includes a swaged collar, an inner member, and an outer member. The swaged collar has a first end, a second end, and a main body extending between the first end and the second end. The main body includes an inner surface defining a passageway through the collar. The inner member has a mandrel section for expanding the outer member. The inner member is used to expand the outer member and to keep the outer member in an expanded state.

20 Claims, 17 Drawing Sheets

U.S. PATENT DOCUMENTS

| | | | |
|---|---|---|---|
| 2,405,399 A | 8/1946 | Bugg et al. | 153/80 |
| 2,430,554 A | 11/1947 | Bugg et al. | 153/80 |
| 2,433,425 A | 12/1947 | Burckle | 285/84 |
| 2,468,985 A | 5/1949 | Krotz | 287/85 |
| 2,528,180 A | 10/1950 | Roehl | 248/56 |
| 2,661,182 A | 12/1953 | Kipp | 251/76 |
| 2,672,175 A | 3/1954 | Howard | 153/80 |
| 2,695,446 A | 11/1954 | Meyer | 29/523 |
| 2,700,172 A | 1/1955 | Rohe | 16/2 |
| 2,808,643 A | 10/1957 | Weatherhead, Jr. | 29/508 |
| 2,943,667 A | 7/1960 | Ewing et al. | 153/80 |
| 3,128,999 A | 4/1964 | Schmitt | 267/1 |
| 3,137,887 A | 6/1964 | Mannino et al. | 16/2 |
| 3,149,860 A | 9/1964 | Hallesy | 285/18 |
| 3,164,054 A | 1/1965 | Biesecker | 85/8.8 |
| 3,244,034 A | 4/1966 | Severdia | 77/62 |
| 3,252,493 A | 5/1966 | Smith | 151/41.7 |
| 3,345,730 A | 10/1967 | Laverty | 29/243.52 |
| 3,358,492 A | 12/1967 | Richter | 72/393 |
| 3,434,746 A | 3/1969 | Watts | 285/162 |
| 3,498,648 A | 3/1970 | Hallesy | 285/343 |
| 3,537,163 A | 11/1970 | Steidl | 29/149.5 |
| 3,566,662 A | 3/1971 | Champoux | |
| 3,674,292 A | 7/1972 | Demler, Sr. | 285/174 |
| 3,693,247 A | 9/1972 | Brown | 29/512 |
| 3,763,541 A | 10/1973 | Jaffe | |
| 3,778,090 A | 12/1973 | Tobin | 285/222 |
| 3,787,945 A | 1/1974 | Pasek et al. | 29/157.4 |
| 3,820,297 A | 6/1974 | Hurd | 52/758 F |
| 3,835,525 A | 9/1974 | King, Jr. | 29/412 |
| 3,875,649 A | 4/1975 | King, Jr. | 29/418 |
| 3,892,121 A | 7/1975 | Champoux et al. | |
| 3,895,409 A | 7/1975 | Kwatonowski | 16/2 |
| 3,915,052 A * | 10/1975 | Ruhl | 411/361 |
| 3,934,325 A | 1/1976 | Jaffe | 29/243.52 |
| 3,949,535 A | 4/1976 | King, Jr. | 52/758 D |
| 3,997,193 A | 12/1976 | Tsuda et al. | 285/47 |
| 4,143,580 A | 3/1979 | Luhm | 85/77 |
| 4,164,807 A | 8/1979 | King, Jr. | 29/523 |
| 4,187,708 A | 2/1980 | Champoux | |
| 4,249,786 A | 2/1981 | Mahoff | 339/15 |
| 4,355,612 A | 10/1982 | Luksch | 123/41.08 |
| 4,386,515 A | 6/1983 | Starke | 72/391 |
| 4,397,061 A | 8/1983 | Kanzaka | 16/2 |
| 4,405,256 A | 9/1983 | King, Jr. | 403/408 |
| 4,423,619 A | 1/1984 | Champoux | |
| 4,425,780 A | 1/1984 | Champoux | |
| 4,447,944 A | 5/1984 | Mohrman | 29/512 |
| 4,471,643 A | 9/1984 | Champoux et al. | |
| 4,482,089 A | 11/1984 | Lindahl et al. | 228/173 C |
| 4,491,358 A | 1/1985 | Choung | |
| 4,522,378 A | 6/1985 | Nelson | 267/141.4 |
| 4,524,600 A | 6/1985 | Champoux et al. | |
| 4,530,527 A | 7/1985 | Holmberg | 285/382.4 |
| 4,557,033 A | 12/1985 | Champoux | |
| 4,583,388 A | 4/1986 | Hogenhout | 72/393 |
| 4,597,282 A | 7/1986 | Hogenhout | 72/370 |
| 4,640,479 A | 2/1987 | Shely et al. | 248/56 |
| 4,665,732 A | 5/1987 | Hogenhout | 72/393 |
| 4,699,212 A | 10/1987 | Andersson et al. | 165/167 |
| 4,755,904 A | 7/1988 | Brick | 361/177 |
| 4,759,237 A | 7/1988 | Fauchet et al. | |
| 4,787,793 A | 11/1988 | Harris | 411/339 |
| 4,809,420 A | 3/1989 | Landy et al. | |
| 4,869,091 A | 9/1989 | Shemeta | 72/393 |
| 4,885,829 A | 12/1989 | Landy | |
| 4,905,766 A | 3/1990 | Dietz et al. | 169/91 |
| 4,934,038 A | 6/1990 | Caudill | 29/523 |
| 4,934,170 A | 6/1990 | Easterbrook et al. | |
| 4,985,979 A | 1/1991 | Speakman | |
| 4,999,896 A | 3/1991 | Mangus et al. | 29/34 B |
| 5,038,596 A | 8/1991 | Noonan et al. | 72/391.4 |
| 5,069,586 A | 12/1991 | Casey | 411/339 |
| 5,083,363 A | 1/1992 | Ransom et al. | |
| 5,093,957 A | 3/1992 | Do | 16/2 |
| 5,096,349 A | 3/1992 | Landy et al. | |
| 5,103,548 A | 4/1992 | Reid et al. | |
| 5,110,163 A | 5/1992 | Benson et al. | 285/382.2 |
| 5,127,254 A | 7/1992 | Copple et al. | |
| 5,129,253 A | 7/1992 | Austin et al. | 72/370 |
| 5,207,461 A | 5/1993 | Lasko | 285/222 |
| 5,218,854 A | 6/1993 | Jarzebowicz et al. | 72/370 |
| 5,245,743 A | 9/1993 | Landy et al. | |
| 5,253,773 A | 10/1993 | Choma et al. | 230/86.2 |
| 5,305,627 A | 4/1994 | Quincey et al. | |
| 5,341,559 A | 8/1994 | Reid et al. | |
| 5,380,111 A | 1/1995 | Westrom | 402/74 |
| 5,380,136 A | 1/1995 | Copple et al. | |
| 5,390,808 A | 2/1995 | Choma et al. | 220/86.2 |
| 5,405,228 A | 4/1995 | Reid et al. | |
| 5,433,100 A | 7/1995 | Easterbrook et al. | |
| 5,466,016 A | 11/1995 | Briody et al. | 285/204 |
| 5,478,122 A | 12/1995 | Seabra | 285/281 |
| 5,607,194 A | 3/1997 | Ridenour | 285/334.5 |
| 5,609,434 A | 3/1997 | Yehezkieli et al. | 403/260 |
| 5,713,611 A | 2/1998 | Kurimoto et al. | 285/382.5 |
| 5,722,312 A | 3/1998 | Kristensen | 92/171.1 |
| 5,806,173 A | 9/1998 | Honma et al. | 29/727 |
| 5,885,318 A | 3/1999 | Shimizu et al. | 65/493 |
| 5,943,898 A | 8/1999 | Kuo | 72/370.07 |
| 5,947,326 A | 9/1999 | O'Hern et al. | 220/802 |
| 6,058,562 A | 5/2000 | Satou et al. | 16/2.1 |
| 6,131,964 A | 10/2000 | Sareshwala | 285/382 |
| 6,217,082 B1 | 4/2001 | Orcutt et al. | 285/272 |
| 6,266,991 B1 | 7/2001 | Kuo | 72/370.07 |
| 6,289,577 B1 | 9/2001 | Tanaka et al. | 29/603.03 |
| 6,325,582 B1 * | 12/2001 | Sadri et al. | 411/361 |
| 6,328,513 B1 | 12/2001 | Niwa et al. | 411/339 |
| 6,347,663 B1 | 2/2002 | Hunzinger et al. | 165/178 |
| 6,488,460 B1 | 12/2002 | Smith et al. | 411/353 |
| 6,499,926 B2 | 12/2002 | Keener | 411/504 |
| 6,537,005 B1 * | 3/2003 | Denham | 411/43 |
| 6,623,048 B2 | 9/2003 | Castel et al. | 285/382 |
| 6,651,301 B1 | 11/2003 | Liu | 29/243.521 |
| 6,705,149 B2 | 3/2004 | Cobzaru et al. | 72/391.4 |
| 6,761,380 B2 | 7/2004 | Pachciarz et al. | 285/204 |
| 6,773,039 B2 | 8/2004 | Muenster et al. | 285/259 |
| 6,796,765 B2 | 9/2004 | Kosel et al. | 415/142 |
| 6,826,820 B2 | 12/2004 | Denham et al. | 29/524.1 |
| RE38,788 E | 9/2005 | Satou et al. | 16/2.1 |
| 7,024,908 B2 | 4/2006 | Poast et al. | |
| 7,047,596 B2 | 5/2006 | Sucic et al. | 16/2.1 |
| 7,059,816 B2 | 6/2006 | Toosky | 411/181 |
| 7,100,264 B2 | 9/2006 | Skinner et al. | |
| 7,273,338 B2 | 9/2007 | Summerlin | |
| 7,375,277 B1 | 5/2008 | Skinner et al. | |
| 7,406,777 B2 | 8/2008 | Grover et al. | 33/645 |
| 7,448,652 B2 | 11/2008 | Poast et al. | |
| 7,695,226 B2 * | 4/2010 | March et al. | 411/43 |
| 7,926,319 B2 | 4/2011 | Johnson | |
| 2003/0110618 A1 | 6/2003 | Magnuson | |
| 2004/0111864 A1 | 6/2004 | Skinner et al. | 29/523 |
| 2006/0251490 A1 * | 11/2006 | Kleinman et al. | 411/39 |
| 2007/0110541 A1 | 5/2007 | Rawlins et al. | |
| 2007/0289351 A1 | 12/2007 | Glenn | |
| 2007/0295050 A1 | 12/2007 | Glenn | |
| 2008/0005887 A1 | 1/2008 | Glenn et al. | |
| 2008/0034831 A1 | 2/2008 | Glenn | |
| 2008/0066518 A1 | 3/2008 | Glenn et al. | |
| 2008/0250603 A1 | 10/2008 | Skinner et al. | 16/2.2 |
| 2010/0260572 A1 * | 10/2010 | Wehrmeister et al. | 411/43 |

FOREIGN PATENT DOCUMENTS

| | | |
|---|---|---|
| DE | 33 01 849 C1 | 7/1984 |
| DE | 3545554 A1 | 7/1987 |
| DE | 89 01 317 U1 | 3/1989 |
| EP | 0 054 592 A1 | 6/1982 |
| EP | 0 140 516 A1 | 5/1985 |
| EP | 0248122 A2 | 12/1987 |
| EP | 0 891 007 A1 | 1/1999 |
| EP | 0 945 919 B1 | 9/1999 |
| EP | 1 166 951 A1 | 1/2002 |
| EP | 1 202 458 A1 | 5/2002 |
| EP | 1525952 A1 | 4/2005 |
| EP | 1611976 A1 | 1/2006 |
| EP | 1903221 A2 | 3/2008 |
| FR | 2645052 | 10/1990 |

| | | |
|---|---|---|
| GB | 593607 | 10/1947 |
| GB | 1395009 | 5/1975 |
| GB | 2 239 917 A | 7/1991 |
| JP | 5713031 | 8/1982 |
| JP | 60238046 A | 11/1985 |
| JP | 61157846 | 7/1986 |
| JP | 10-274366 | 10/1998 |
| JP | 2001-177964 | 6/2001 |
| SU | 632463 | 11/1978 |
| WO | 8400120 A1 | 1/1984 |
| WO | WO02059489 A1 | 8/2002 |
| WO | 2007082077 A1 | 7/2007 |
| WO | 2007121932 A1 | 11/2007 |

OTHER PUBLICATIONS

PCT International Search Report and Written Opinion from counterpart PCT Application No. PCT/US2008/080224, 16 pages, Jan. 29, 2009.

* cited by examiner

EXPANDABLE FASTENER ASSEMBLY WITH DEFORMED COLLAR

CROSS-REFERENCE TO RELATED APPLICATION

This application claims the benefit under 35 U.S.C. §119 (e) of U.S. Provisional Patent Application No. 60/999,517, filed Oct. 16, 2007, which is incorporated herein by reference in its entirety.

BACKGROUND

1. Field of Technology

This disclosure generally relates to expandable fastener assemblies and methods of using the same.

2. Description of the Related Art

Fastener assemblies are often used to interconnect a plurality of workpieces, such as a stack of plates or other structural members. Conventional fastener assemblies have a bolt and a collar that cooperate to apply a clamp-up force to the workpieces. For example, two workpieces can be joined together by overlapping the workpieces to create a joint. A fastener assembly can be installed at the joint by drilling a hole through the overlapping portions of the workpieces and positioning a rod in the hole. The workpieces are clamped between a head of the rod and the collar. Unfortunately, these types of joints are susceptible to fatigue damage and have undesired electrical properties.

Contaminates (e.g., moisture, chemicals, debris, and other foreign substances) can become lodged between faying surfaces of joints resulting in increased wear and corrosion. Cyclic loading can lead to fatigue problems. The fastener assembly may allow the workpieces to move relative to one another, which may result in fretting, excessive stresses at the interface of the hole and fastener assembly, vibrations, and the like. In aerospace applications, conventional joints may thus have a relatively short in-service life.

Aircraft are often made of lightweight composite structures that are unable to withstand high electrical currents as well as their metallic counterparts. Composite structures may be damaged by high electrical currents caused by lightning strikes because composite structures do not readily conduct away the electrical currents and electromagnetic forces generated by lightning strikes. Electrical currents tend to not pass through the composites structures (e.g., carbon fiber structures) with poor electrical conductivity and instead pass through highly conductive materials, such as metals. Metal fastener assemblies can conduct electrical currents between layers of composite structures. Unfortunately, loosening of the components of the fastener assembly may result in movement between these components of the fastener assembly, movement of the workpiece, and the accumulation of contaminates at the faying surfaces. These problems may result in arcing or other electrical related problems that may cause fires or explosions. Conventional fastener assemblies may thus be unsuitable for many aerospace applications. Additionally, conventional sleeve/bolt systems have a tendency to cause damage in composite laminates when tolerances stack up to make interferences relatively high. Leading edges of conventional bolts are too abrupt for use with thin-walled sleeves. Shear loading along the holes of composite workpieces may be damaged (e.g., delamination), during installation.

BRIEF SUMMARY

Some embodiments disclosed herein include fastener assemblies adapted to apply desired clamp-up forces to workpieces. The fastener assemblies can be installed in openings in the workpieces in order to hold together the components of the workpieces. In some embodiments, the fastener assemblies can be installed in a joint of an aircraft. The installation can have desirable mechanical characteristics, electrical characteristics, and the like for enhancing performance, even after extended use under cyclic loading, static loading, or both.

In some embodiments, an installation includes a workpiece and a fastener assembly. The fastener assembly includes a swaged collar, an inner member, and an expanded outer member. The outer member is between the inner member and the workpiece. The swaged collar is coupled to the outer member or the inner member, or both. The inner member, in some embodiments, has a relatively narrow section, a relatively wide section, and a mandrel section between the narrow section and the wide section. A portion of the outer member is in an expanded state and is between the wide section and the workpiece. The workpiece is captured between the collar on one side of the workpiece and a head of the outer member on another side of the workpiece. In some embodiments, the workpiece comprises multiple components that are held together by the fastener assembly.

In some embodiments, a method of fastening together a multi-piece workpiece having an opening is provided. The opening extends between a first side and a second side of the workpiece. The method includes positioning a hollow expandable fastener through the opening. An inner member is positioned within the hollow expandable fastener. The inner member includes a mandrel section and is on the second side of the workpiece. The inner member is moved through the expandable fastener to radially expand at least a portion of the fastener. A collar is positioned on the first side of the workpiece. The collar, in some embodiments, is radially compressed onto coupling features of the expanded fastener to capture the workpiece between a head of the fastener and the collar.

In some embodiments, an installation comprises a workpiece, a swaged collar, an inner member, and a radially expanded outer member. The workpiece has an opening. The swaged collar has a first end, a second end, and a main body extending between the first end and the second end. The main body includes an inner surface defining the passageway. The inner member has a narrow section, a propping section, and a mandrel section between the narrow section and the propping section. The radially-expanded outer member is in the opening of the workpiece. The inner surface of the collar has been compressed against at least one locking feature of the expanded outer member to fix the collar and the outer member together. The outer member has been expanded from an unexpanded state to an expanded state by the mandrel section. The propping section keeps the outer member in the expanded state to maintain an interference fit and/or induced fatigue enhancing compressive stresses in the workpiece produced when the outer member is expanded from the unexpanded state to the expanded state. In some embodiments, the unexpanded outer member can fit in the opening with a clearance fit.

In some embodiments, a fastener assembly is installed in an opening of a workpiece and comprises a collar, an outer member, and an inner member. The outer member is configured to be positioned in the opening of the workpiece. The outer member includes a longitudinally-extending passageway, a coupling section, a head, and an expandable section between the coupling section and the head. The coupling section is adapted to protrude from the workpiece and to be coupled to the collar. The inner member includes a narrow section, a propping stem, and a mandrel section between the narrow section and the propping stem. The propping stem is dimensioned and configured to prop the expandable section of the outer member after the mandrel section radially expands the expandable section in the opening of the workpiece. In some embodiments, the outer member is radially expanded from an initial configuration for placement in the opening of the workpiece to an expanded configuration to cold work the workpiece and/or to produce an interference fit with the workpiece. The outer member in the initial configuration can provide a clearance fit with the opening of the workpiece.

In some embodiments, a method for fastening together a multi-component workpiece having an opening extending between a first side and a second side is provided. The method includes positioning a hollow outer member in the opening of the workpiece. A portion of an inner member on the second side of the workpiece is moved within the hollow outer member. The inner member includes a mandrel section. At least a portion of the outer member and the workpiece is expanded using the mandrel section of the inner member. The collar is positioned on the first side of the workpiece such that the collar surrounds the outer member. The collar is swaged. In some embodiments, swaging the collar includes forming longitudinally-extending grooves along an exterior of the collar.

In some other embodiments, a swaging assembly for an installation apparatus includes a housing and an actuating device. The housing has a first end, a second end, and a bore extending between the first end and the second end. The actuating device includes a passageway and a plurality of spaced apart bearing elements surrounding the passageway. The actuating device is movable through the bore towards the second end such that the bearing elements swage a collar of a fastener assembly protruding from a workpiece against which the swaging assembly is placed.

In some embodiments, a fastener assembly can include an inner member, an outer member, and a collar. The wall thickness of the outer member can be sufficiently large to ensure that the outer member induces compressive stresses in the workpiece and/or an interference fit with a workpiece when the outer member is radially expanded. In some embodiments, the wall thickness of the outer member can be generally equal to a wall thickness of the collar.

In some embodiments, a fastener assembly includes an inner member, an outer member, and a collar. The inner member can radially expand the outer member to form an interference fit with the workpiece. The workpiece can comprise a composite material. For example, the workpiece can comprise one or more composite panels and one or more metal panels. The workpiece can be a stack of different types of panels, and the outer member can form interference fits with each of these panels. Advantageously, the outer member can be inserted through the stack with a clearance fit to minimize, limit, or substantially prevent damage of any of the panels, including composite panels, if any. In some embodiments, the outer member can be radially expanded a sufficient amount to produce compressive stresses in the workpiece. For example, the workpiece can be comprised mostly or entirely of metal in which compressive stresses can be induced without cracking the workpiece. If the workpiece comprises composite materials, the compressive stresses can be kept below a level that causes damage to the workpiece. In some embodiments, compressive stresses that improve fatigue performance may not be produced in the workpiece.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale.

DETAILED DESCRIPTION OF THE DISCLOSURE

In the following description, certain specific details are set forth in order to provide a thorough understanding of various aspects of the representative embodiments. One skilled in the art, however, will understand that the embodiments may be practiced without these details. The fastener assemblies, installation apparatuses, and processes disclosed herein can be used to couple together workpieces and, in some embodiments, may improve in-service performance of these workpieces, such as electrical performance, mechanical performance, fatigue performance, or the like. The fastener assemblies can be expandable fastener assemblies installed in different types of workpieces and at a wide range of locations. The term "expandable fastener assembly" refers to a fastener assembly both in a pre-expanded state and an expanded state, unless the context dictates otherwise.

Unless the context requires otherwise, throughout the specification and claims which follow, the word "comprise" and variations thereof, such as, "comprises" and "comprising" are to be construed in an open, inclusive sense, that is as "including, but not limited to."

The terms "proximal" and "distal" are used to describe the illustrated embodiments and are used consistently with a description of non-limiting exemplary applications. The terms "proximal" and "distal" are used in reference to the user's body when the user operates an installation apparatus to install fasteners assemblies, unless the context clearly indicates otherwise. It will be appreciated, however, that the illustrated embodiments can be located or oriented in a variety of desired positions.

As used in this specification and the claims, the singular-forms "a," "an," and "the" include plural referents unless the content clearly dictates otherwise. It should also be noted that the term "or" is generally employed in its sense including "and/or" unless the context clearly dictates otherwise.

Figure 1:
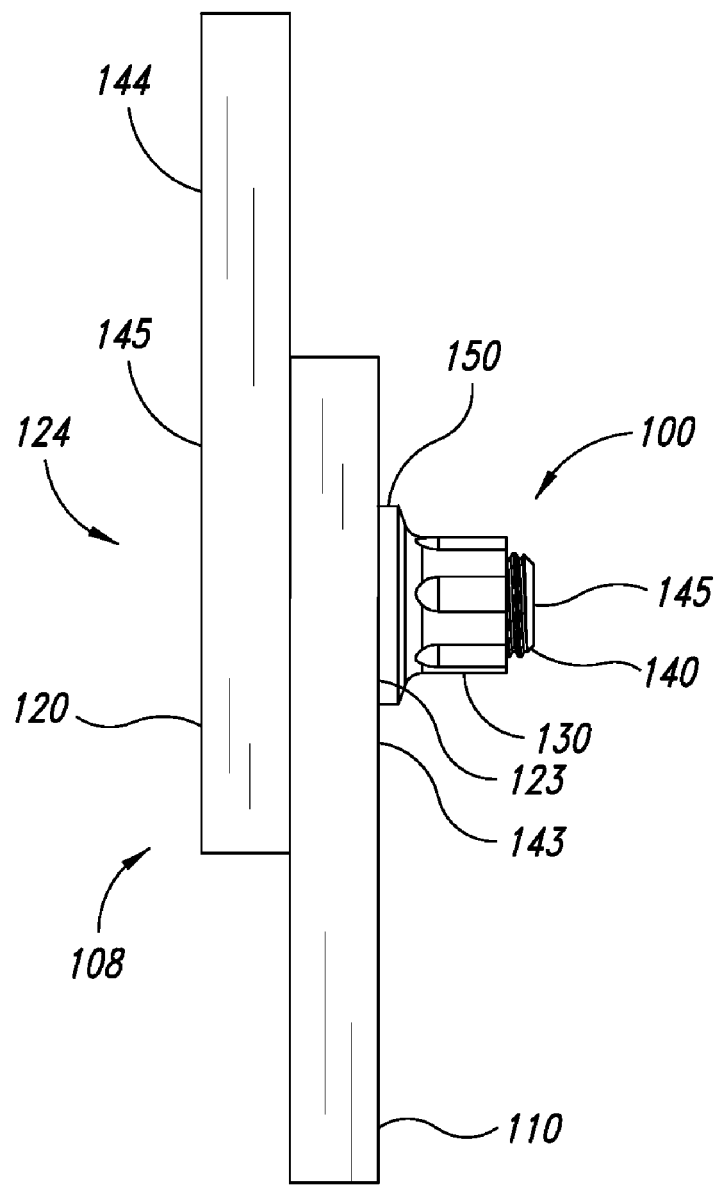
FIG. 1 is a side elevational view of an installation including a multi-component workpiece and an expandable fastener assembly that has a deformed collar, according to one illustrated embodiment.
Figure 2:
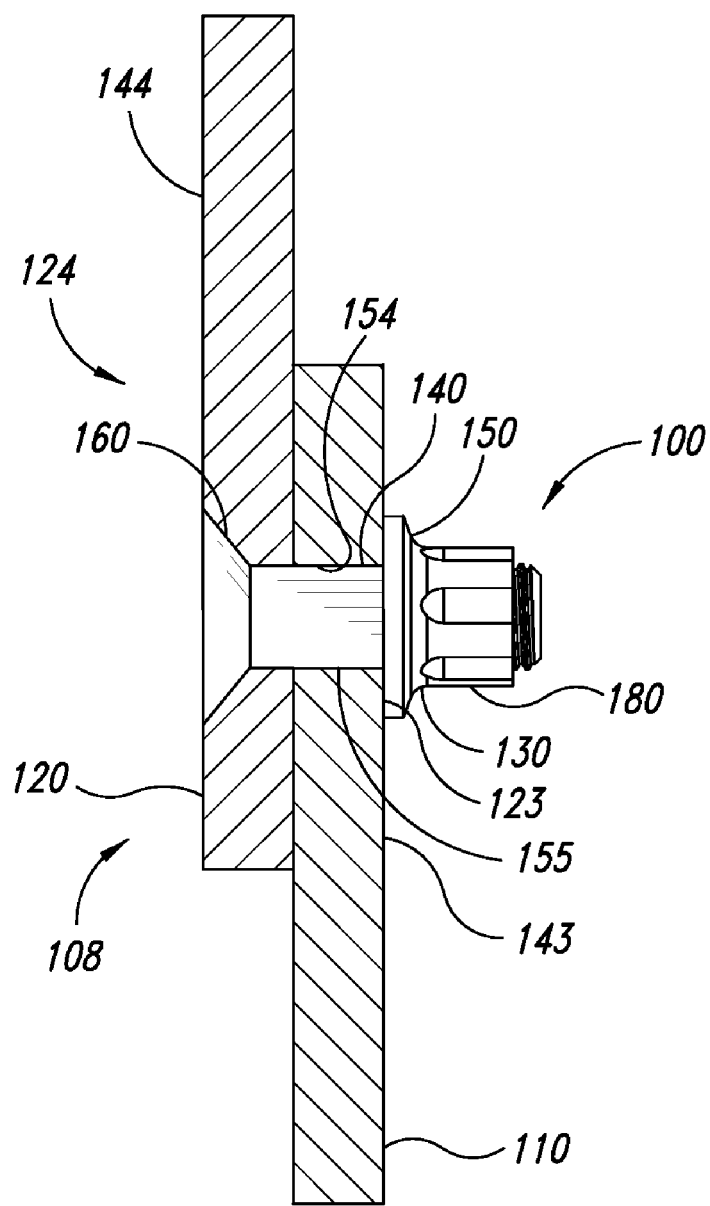
FIG. 2 is a partial cross-sectional view of an installation of FIG. 1.
Figure 3:
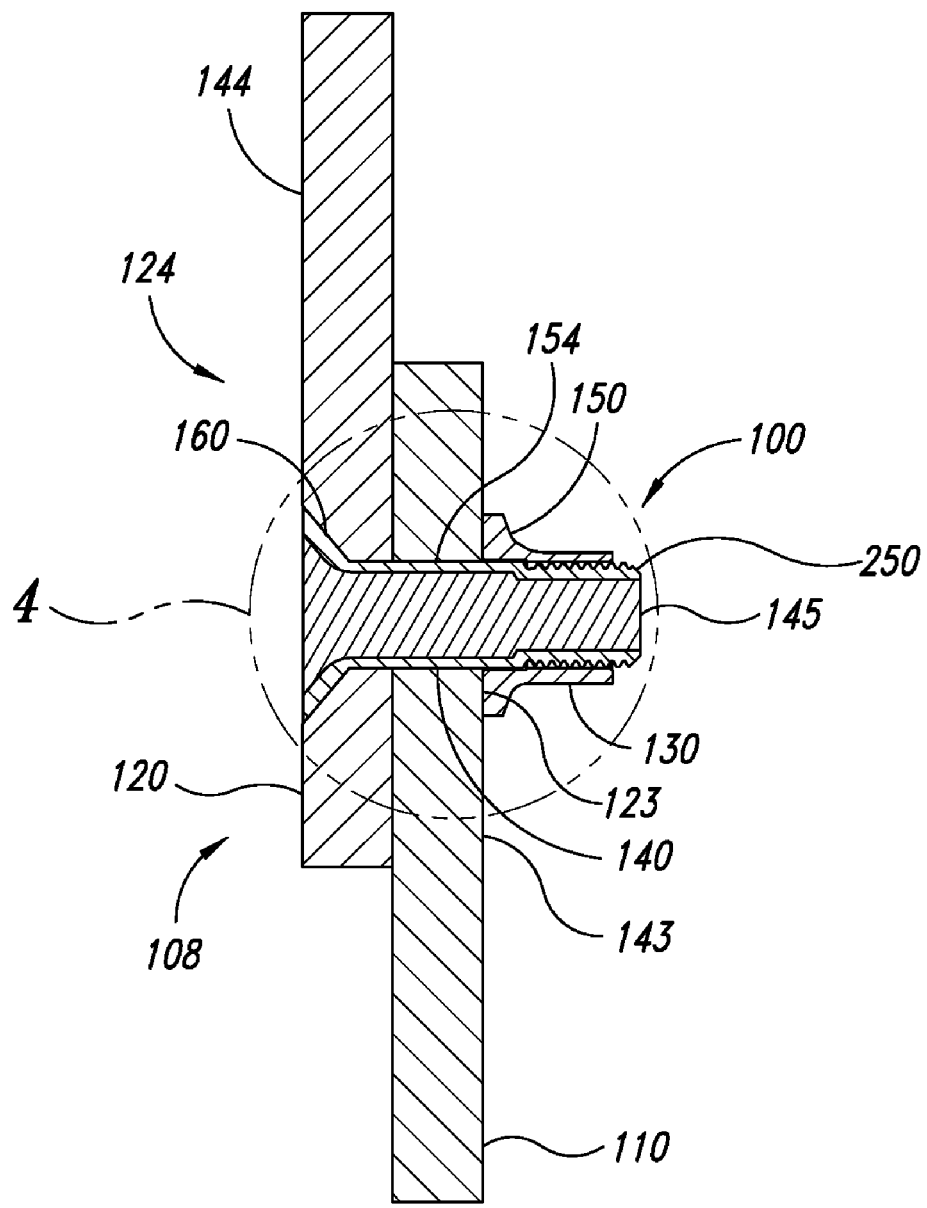
FIG. 3 is a cross-sectional view of the installation of FIG. 2.

FIGS. 1-3 show an expandable fastener assembly 100 installed in a multi-component workpiece 108. The workpiece 108 includes a first structural member 110 and a second structural member 120 that overlaps the first structural member 110 to form a lap joint 124. The fastener assembly 100 includes a deformable collar 130, an expandable outer member 140 extending through the workpiece 108 and the collar 130, and an inner member 145 extending through the outer member 140. The workpiece 108 is captured between a flange 150 of the collar 130 and a head 160 of the outer member 140 to reduce, limit, or substantially prevent relative movement between the members 110, 120. The illustrated collar 130 and head 160 are positioned on first and second sides 143, 144 of the workpiece 108, respectively. A user on the first side 143 of the workpiece 108 can install the fastener assembly 100.

As used herein, the term "expandable outer member" is a broad term and includes, but is not limited to, a fastener, bushing, sleeve (including a split sleeve), fitting, structural expandable member (e.g., expandable members that are incorporated into structural workpieces), or other one-piece or multi-piece structures suitable for installation in a workpiece. An expandable outer member can be expanded from a first configuration to a second configuration. In some embodiments, for example, the expandable outer member 140 is a hollow fastener that is radially expanded from an initial pre-expanded state to a post-expanded state in order to create a desired fit, such as an interference fit, with an inner surface 154 forming an opening 155, illustrated as a through-hole in the workpiece 108. The term "expandable outer member" refers to an outer member both in a pre-expanded state and post-expanded state, unless the context clearly dictates otherwise. The illustrated outer member 140 is in a post-expanded state.

Various types of expansion processes may be employed to install the fastener assembly 100. In a cold expansion process, for example, the expandable outer member 140 is radially expanded without appreciably raising the temperature of the outer member 140 to produce residual stresses in the workpiece 108. The residual stresses can significantly increase fatigue life by reducing the applied stresses at the opening 155 to reduce the stress intensity factor and to increase the crack growth life. In some embodiments, the magnitude of the peak residual compressive circumferential stress at the opening is less than or about equal to the compressive yield stress of the workpiece 108. The compressive stress zone may span one radius to one diameter from the edge of the opening 155. A balancing zone of tensile stresses can be located beyond the circumferential compressive stress zone. The compressive stresses in the workpiece can be sufficient to alter fatigue performance of the workpiece to increase the service life of the workpiece by, for example, at least about 10×, 30×, or 50×. The illustrated expanded fastener assembly of FIGS. 1-3 may induce compressive stresses in the workpiece 108 for enhanced fatigue performance.

As used herein, the term "workpiece" is broadly construed to include, without limitation, a structure suitable for receiving the fastener assembly 100. Workpieces can have at least one opening in which the fastener assembly 100 is installed and can be made, in whole or in part, of one or more metals (e.g., steel, aluminum, titanium, or the like), polymers, plastics, composites, resins, combinations thereof, or the like. Multi-component workpieces can include any number of panels, sheets, or other components capable of being coupled together using the fastener assembly 100. The illustrated workpiece 108 includes two flat panels 110, 120 mated together; however, any number of panels (e.g., three or more panels) can be held together using the fastener assembly 100. In other embodiments, the workpiece 108 can be a single panel. Such workpieces can be made, in whole or in part, of a composite material, such as a multi-laminate panel. The fastener assembly 100 can help inhibit, limit, or substantially prevent damage, such as delamination. Hybrid workpieces can be made of a wide range of different materials, including composite materials and metals. In some embodiments, the workpiece is a hybrid workpiece includes one or metal panels and one or more composite panels.

In some embodiments, the workpiece includes a plurality of panels. At least one of the panels can comprises a composite material (e.g., a fiber-reinforced composite material) and at least one of the panels comprises another material, such as a metal. A clearance fit can be produced with each of the panels to insert the outer member 140 into the workpiece. An interference fit is produced with each of the panels when the outer member 140 is expanded. In some embodiments, a hybrid workpiece includes one or metal panels and one or more composite panels. In some embodiments, the workpiece includes only metal panels or only composite panels. Any number of panels can be connected together using the fastener assembly 100.

With continued reference to FIGS. 1-3, the collar 130 has been deformed to couple the collar 130 to the expanded outer member 140. The outer member 140 can be tensioned to inhibit or prevent loosening of the collar 130. The head 160 of the outer member 140 and the collar 130 can compress the workpiece 108 to limit, minimize, or substantially prevent fretting of the panels 110, 120.

The collar 130 provides generally uniformly distributed stresses (e.g., contact stresses) in a region of an outer surface 123 of the panel 120 proximate the opening 155 to avoid unwanted stress concentrations. For example, if the workpiece 108 is made of a composite material that is susceptible to cracking or delaminating, the flange 150 and/or head 160 can have a radial thickness sufficiently large to keep compressive stresses in the workpiece 108 at or below an acceptable level to limit, reduce, or eliminate cracking or delamination. The fastener assembly 100 can also enhance the desired electrical conductivity of the workpiece 108 and, in some embodiments, maintains the integrity of coatings, including platings, or any other treatments on the workpiece 108, even coating on faying surfaces. The outer member 140 can insulate the workpiece 108 from the inner member 145 such that an electrical current can pass through the inner member 145.

Figure 4:
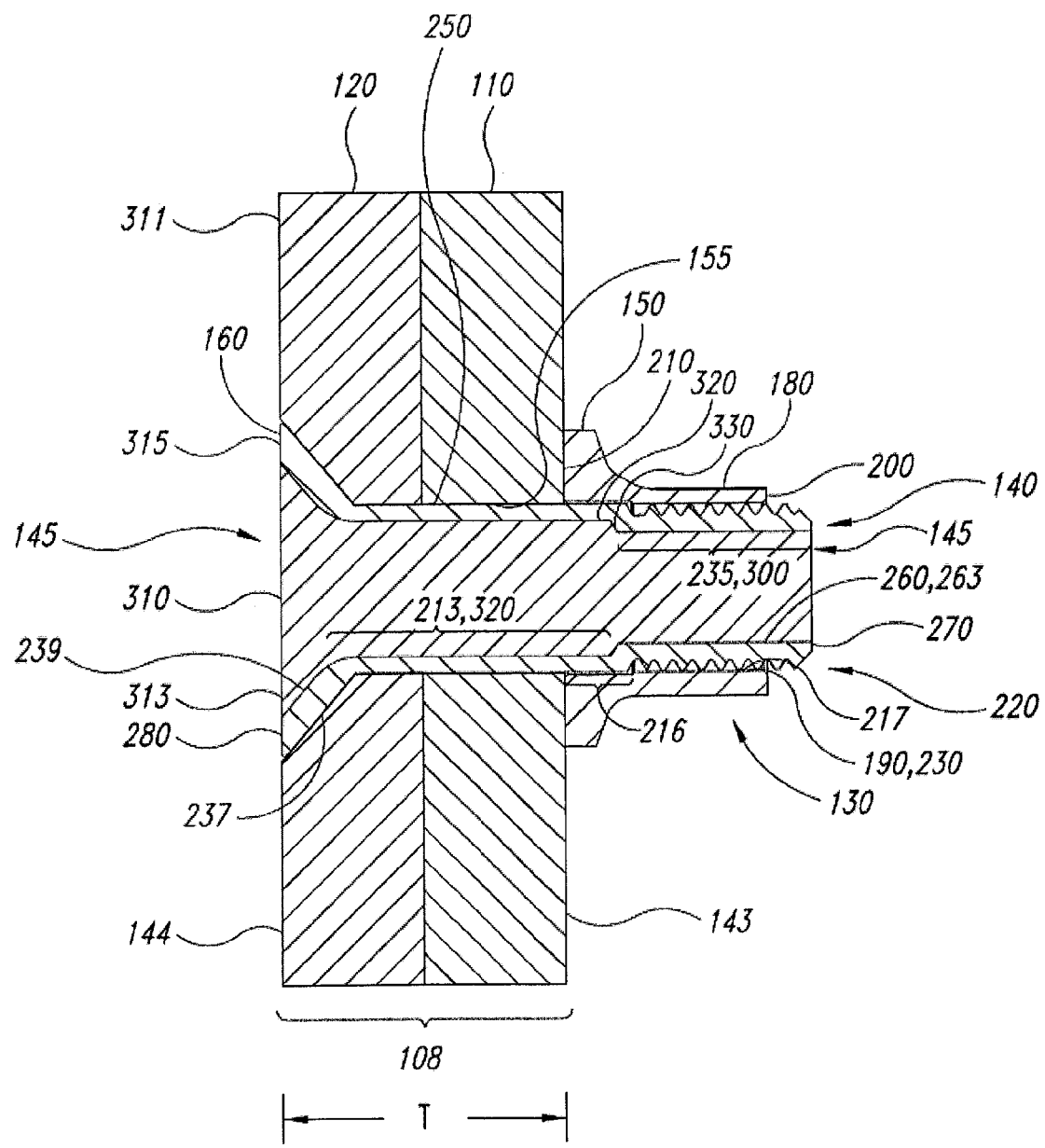
FIG. 4 is a detailed view of the fastener assembly of FIG. 3.

Referring to FIG. 4, the collar 130 includes a main body 180 extending generally longitudinally from the flange 150 and a passageway 190 extending between opposing ends 200, 210 of the collar 130. The illustrated collar 130 is a swagable collar. The term "swagable collar" refers to a collar both in a pre-swaged state and a post-swaged state, unless the context clearly dictates otherwise. A swaging process has been performed to axially and rotationally fix the swaged collar 130 shown in FIG. 4 to the outer member 140.

The expandable outer member 140 of FIG. 4 includes a tubular main body 250 extending generally longitudinally from the head 160 and a longitudinally-extending passageway 260 extending between opposing ends 270, 280. The tubular main body 250 includes a radially expandable portion 213 and a coupling section 235. The expandable portion 213 extends from the head 160 through the panels 110, 120. At least a substantial portion of the opening 155 can be radially expanded to produce a desired fit with the expandable portion 213. The axial length of the expandable portion 213 can be selected based on the thickness T of the workpiece 108. For example, the axial length of the expandable portion 213 can be slightly less than, equal to, or slightly greater than the thickness T of the workpiece. Substantially all of the longitudinal length of the expandable portion 213 is in an expanded state. For example, at least 90% of the length of the expandable portion 213 can be expanded. Thus, most of the opening 155 between the head 160 and collar 130 is also expanded.

The expandable portion 213 can protrude from the first side 143 of the workpiece 108 such that the entire opening 155 is expanded. The coupling section 235 includes a plurality of locking features 220 proximate the end 270. The locking features 220 are illustrated as external grooves that can bear against an inner surface 217 of the collar 130. The external grooves 220 can be helical external threads, an array of spaced apart grooves, or the like. The locking features 220 can also be bumps, ridges, projections, recessed regions, combinations thereof, or the like. The locking features 220 and the inner surface 217 can lock together to axially fix and/or rotationally fix the collar 130 to the outer member 140.

The inner surface 217 can be a generally smooth tubular surface and can be made, in whole or in part, of a material with a yield strength that is less than the yield strength of the material of the locking features 220. When the inner surface 217 is compressed against the locking features 220, the locking features 220 can cause appreciable deformation (e.g., plastic deformation, elastic deformation, or both) of the inner surface 217. In this manner, the collar 130 can be locked to the expandable outer member 140. In some embodiments, the coupling section 235 has one or more coupling features (e.g., internal threads, a bonding layer, an adhesive, etc.) that facilitate coupling with the locking features 220.

The head 160 is in the form of a chamfered flange for seating in a countersink 237 of the workpiece 108. The head 160 has a countersink 239 to receive a complementary shaped head 310 of the inner member 145. An outer surface 315 of the head 160 is generally flush with an outer surface 311 of the panel 120 and an outer surface 313 of the head 310. The configurations of the countersinks 237, 239 can be selected such that the head 160 and/or head 310 sit slightly above, at, or below the surface 311 of the panel 120. The outer surfaces 311, 313, 315 can be made flush using various processes, such as a machining process, to be within a desired tolerance, for example, a manufacturing tolerance associated with the installation. The illustrated heads 160, 310 can reduce the occurrence of lightning strikes.

In other embodiments, the heads 160, 310 may protrude from the second side 144 of the workpiece 108. For example, the head 160 can lie along and protrudes from the surface 311 of the panel 120.

Figure 5:
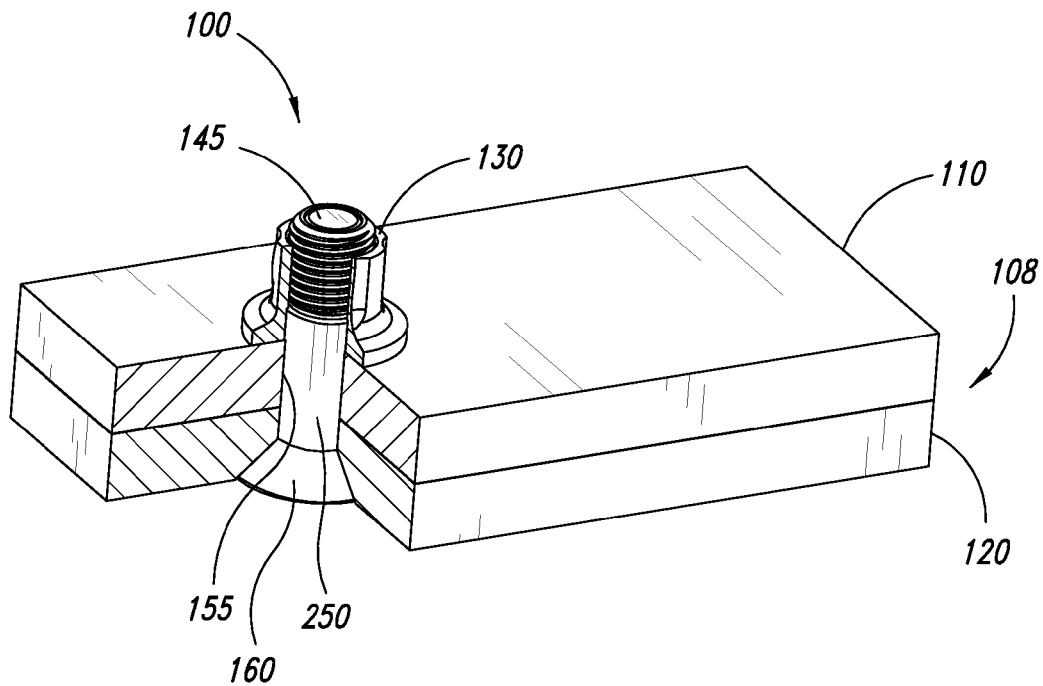
FIG. 5 is an isometric view of an expandable fastener assembly installed in a multi-component workpiece. The workpiece and a collar of the fastener assembly are shown cut-away.
Figure 6:
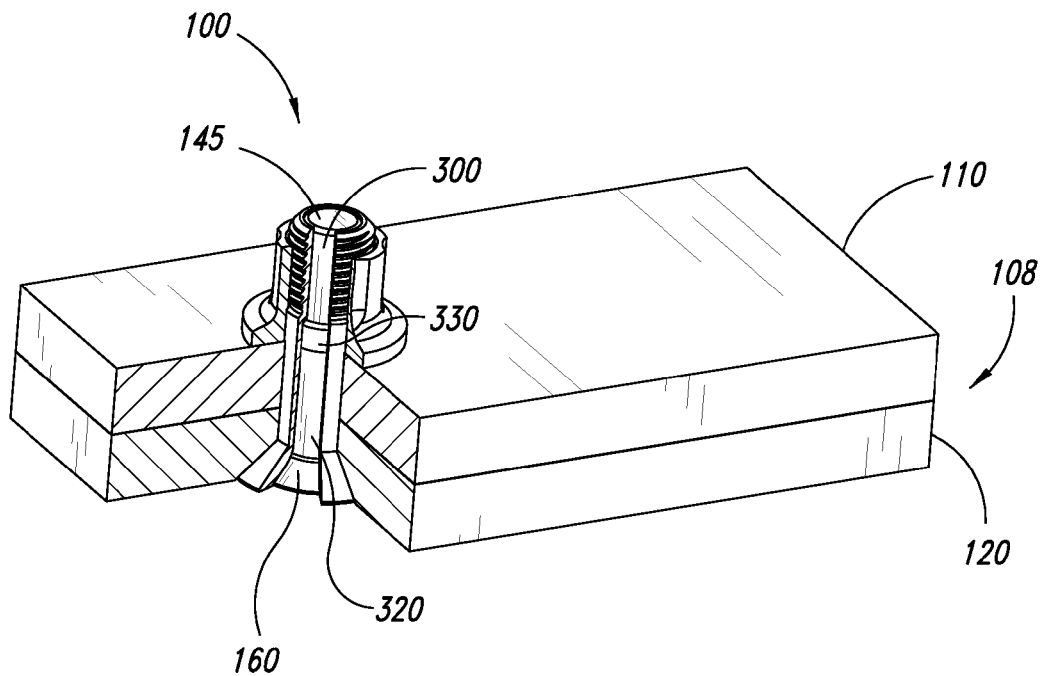
FIG. 6 is an isometric view of the fastener assembly and the workpiece of FIG. 5. The workpiece, the collar, and an expandable outer member are shown cut-away.

Referring to FIGS. 4-6, the inner member 145 is shown installed (i.e., after it has expanded the outer member 140 and has been broken apart). The inner member 145 includes a narrow section 300, the head 310, and a stem 320 between the narrow section 300 and head 310. A mandrel section 330 is positioned between the narrow section 300 and the stem 320.

The mandrel section 330 can expand the outer member 140, and in some embodiments, the stem 320 can limit or substantially prevent constriction of the outer member 140. The stem 320 can prop the expanded portion 213 to maintain desired compressive stresses in the workpiece 108. The inner member 145 can be, without limitation, a fastener, a rod (e.g., a threaded rod), a bolt, a stud, a shank, a mandrel, or the like. The illustrated inner member 145 has a solid cross-section.

With continued reference to FIG. 4, a selected amount of residual compressive stress is induced in the workpiece 108 because of the radial expansion of the outer member 140. The compressive stresses may enhance the fatigue life of the installation. The amount of radial expansion of the outer member 140 may be selected to achieve corresponding amounts of residual compressive stresses in the workpieces 110, 120. The fastener assembly 100 is suitable for performing a cold expansion process. The process of cold expansion is broadly interpreted as any process that radially expands at least some of the material surrounding the opening 155 with appreciably raising the temperature of the workpiece 108. It is further understood that cold working the opening 155 may or may not induce beneficial compressive residual stresses and may or may not produce fatigue-enhancing benefits in the structural workpiece 108. Determining the desired amounts of stresses in the workpieces 110, 120, the amount of interference between the outer member 140 and the inner member 145, and the amount of interference fit between the outer member 140 and the collar 130 may be an iterative process to achieve specific design goals, for example, installing the assembly 100 into the workpiece 108 without damaging the workpiece 108. In some embodiments, the interference fits are sufficient to keep the outer member 140 and/or inner member 145, even without installing the collar 130, from migrating under operation, vibration, and/or other types of loads.

If the workpiece 108 is made of a low strain material, over expansion may cause strains that may cause crack initiation, crack propagation, fracture, or the like. In addition, if the workpiece 108 is made of fiber-reinforced composites, excessive strains may cause delamination between layers, fiber de-bonding, or the like. The outer member 140 can be inserted into the workpiece 108 with a clearance fit to reduce, limit, or substantially prevent damage to the composite workpiece 108. A high interference can be achieved without over-expanding the member 140 to limit, reduce, or substantially prevent damage associated with over expansion. The high interference fit can also increase the fatigue life of the workpiece 108 because the workpieces 110, 120 are held tightly together. The inner member 145 can prevent an appreciable amount of contraction of the expanded member 140 to achieve a wide range of high interference fits.

Figure 7:
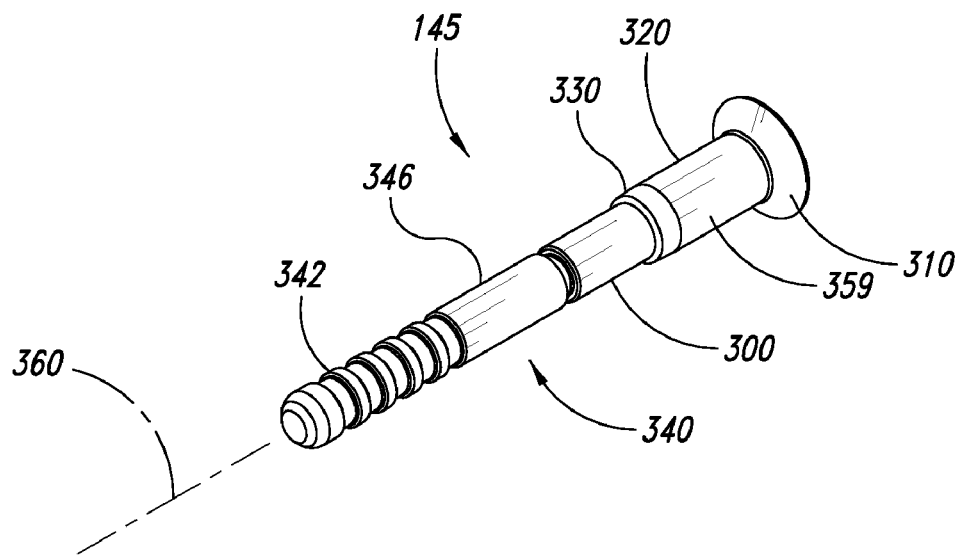
FIG. 7 is a pictorial view of an inner member of an expandable fastener assembly, according to one embodiment.
Figure 8:
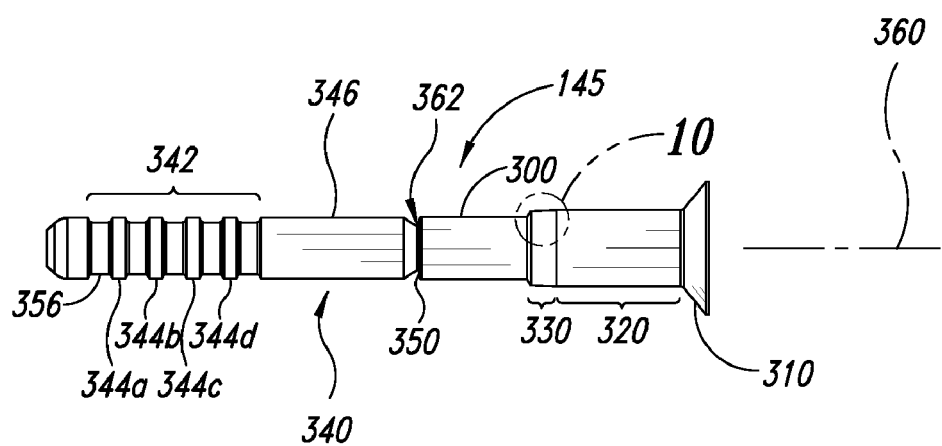
FIG. 8 is a side elevational view of the inner member of FIG. 7.

FIGS. 7-8 show the inner member 145 prior to installation. The inner member 145 includes a detachable section 340 coupled to the narrow section 300. The detachable section 340 includes an engagement region 342 and a shank 346. The detachable section 340 is a break away component and can be integrally formed with the narrow section 300. In other embodiments, the detachable section 340 is a separate component that is detachably coupled to the narrow section 300 by an adhesive, weld, or the like.

The engagement region 342 can be releasably coupled to an installation apparatus and includes a plurality of engagement features 344a, 344b, 344c, 344d (collectively 344). In some embodiments, including the illustrated embodiment of FIGS. 7 and 8, the engagement features 344 are circumferential grooves spaced apart from each other with respect to a longitudinal axis 360 of the inner member 145. The engagement features 344 can be other types of coupling features for temporarily or permanently coupling to installation apparatuses.

Figure 9:
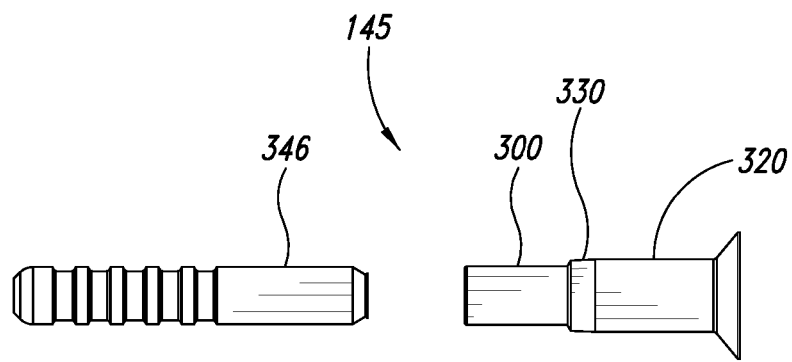
FIG. 9 is a side elevational view of the inner member of FIG. 7 after the inner member has been broken apart.

When a sufficient force is applied to the engagement region 342, the inner member 145 breaks at the decoupling feature 350 to allow separation of the shank 346 and the narrow section 300, as shown in FIG. 9. A cross-sectional area taken at 362 of the decoupling feature 350 is less than the cross-sectional areas of the other sections of the inner member 145. The cross-sectional area at 362 can thus be the minimum cross-sectional area of the member 145. The decoupling feature 350 may serve as a crack initiation site. Cracks can propagate generally along a plane that is substantially perpendicular to the longitudinal axis 360. FIG. 9 shows the detachable section 340 separated from the narrow section 300 after the decoupling feature 350 has fractured.

The decoupling feature 350 can be an edge notch. Exemplary edge notches can include, without limitation, a circumferential groove having a generally U-shaped cross-section, V-shaped cross-section, or the like. Other types of edge notches or parting features can be used to control stress concentrations, crack initiation, and/or crack propagation such that the detachable section 340 is separable from the narrow section 300 without appreciably damaging to any significant extent other components of the fastener assembly 100.

Figure 10:
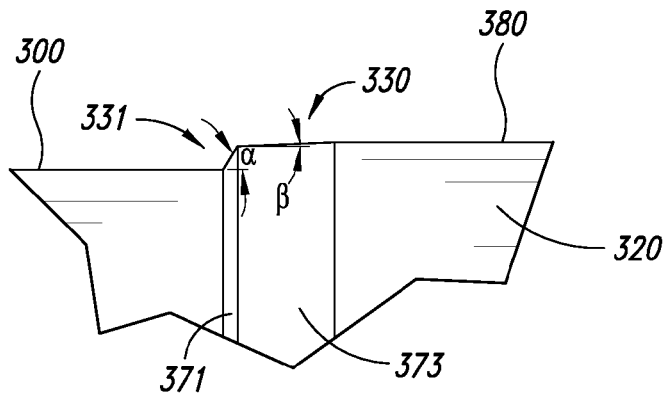
FIG. 10 is a detailed view of the inner member of FIG. 8.

FIG. 10 shows the mandrel section 330 includes a first expansion portion 331 and a second expansion portion 333. The first expansion portion 331 is connected to the narrow section 300. The second expansion portion 333 is connected to the stem 320. Angles of taper $\alpha$, $\beta$ of the expansion portions 331, 333, respectively, can be selected based on the desired amount of expansion of the outer member 140, rate of expansion of the outer member 140, desired stresses/strains of the outer member 140 and/or the workpiece 108. In some embodiments, the angle of taper $\alpha$ is equal to or greater than the angle of taper $\beta$. For example, the angle $\alpha$ can be at least 30 degrees greater than the angle $\beta$. Such embodiments are especially well suited for controlled expansion without producing significant amounts of longitudinally displaced material of the components, e.g., longitudinally displaced material of a sidewall of the outer member 140. Surfaces 371, 373 of the mandrel section 330 can thus slide smoothly along the inner surface of the outer member 140.

Figure 11:
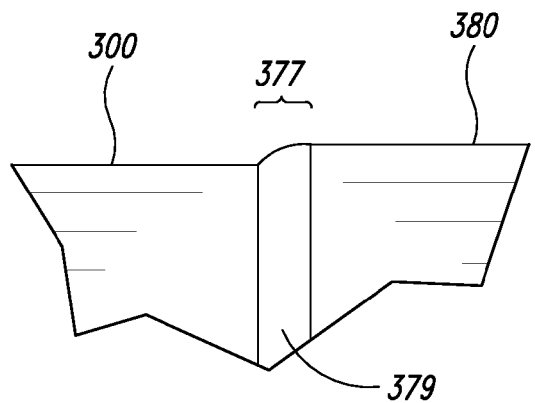
FIG. 11 is a detailed view of a mandrel section of an inner member, in accordance with one embodiment.

FIG. 11 shows a mandrel section 377 that has a longitudinally curved surface 379 for sliding smoothly along the outer member 140. The mandrel section 377 can expand the outer member 140 without producing as much longitudinally material as the mandrel section 330 of FIG. 10.

Figure 12:
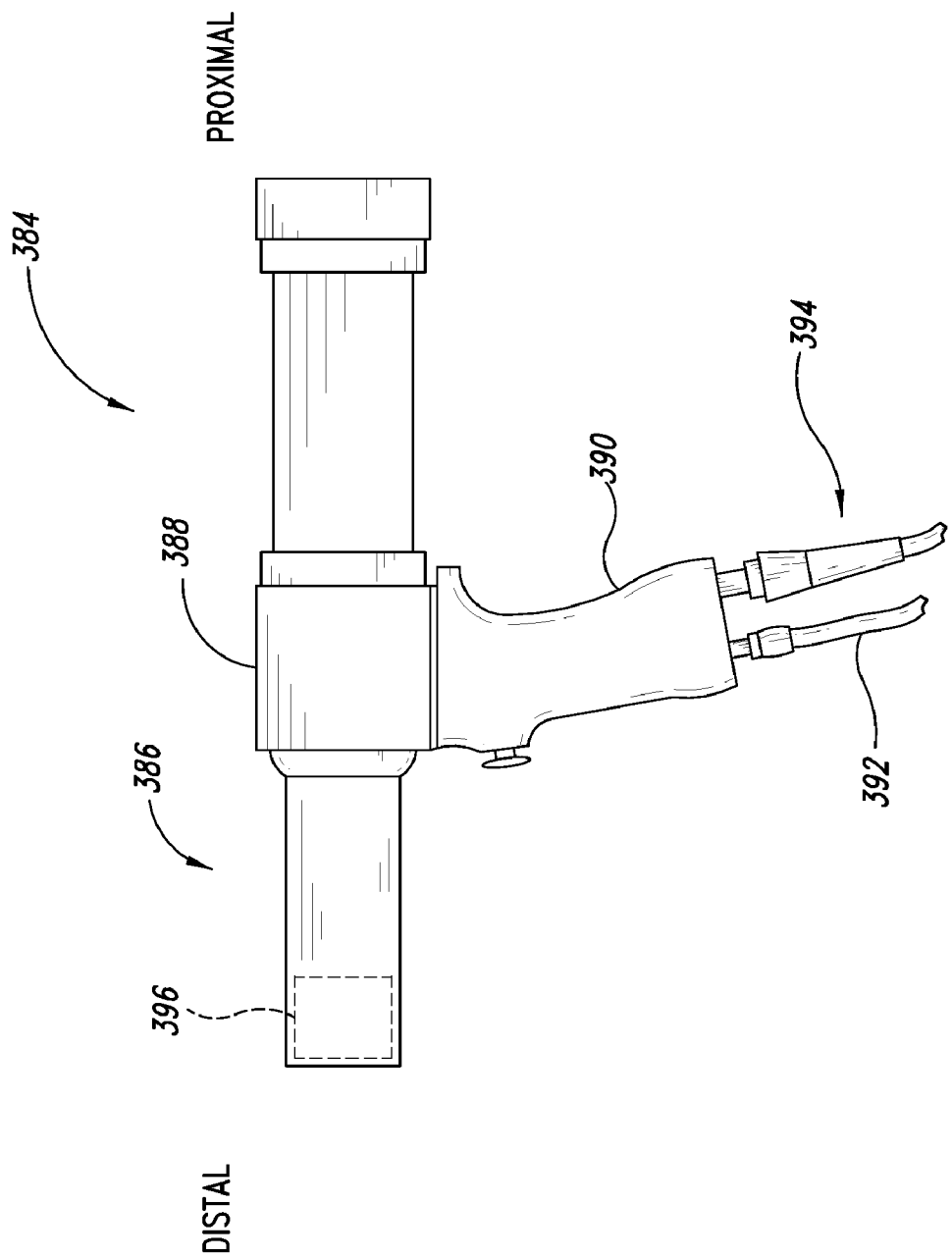
FIG. 12 is a side elevational view of an installation apparatus for installing an expandable fastener assembly, in accordance with one embodiment.

FIG. 12 shows an installation apparatus 384 that includes an installation tool 386 for installing the fastener assembly 100. Generally, the installation tool 386 includes an actuator unit 388 (illustrated as a puller unit) and a swaging assembly 396 (shown in dashed line) carried by the puller unit 388. The puller unit 388 includes a grip 390. A user can manually grasp the grip 390 for comfortably holding and accurately positioning the installation tool 386. The illustrated grip 390 is a pistol grip. However, other types of grips can also be utilized.

The installation tool 386 can be driven electrically, hydraulically, pneumatically, or by any other suitable drive system. In some embodiments, the puller unit 388 houses a drive system capable of driving a component of the fastener assembly 100, preferably along a predetermined path (e.g., a line of action), in a proximal direction and/or distal direction. A pair of fluid lines 392, 394 of the installation apparatus 384 provides pressurized fluid (e.g., pressurized gas, liquid, or a combination thereof) to a piston drive system that operates the swaging assembly 396.

Figure 13:
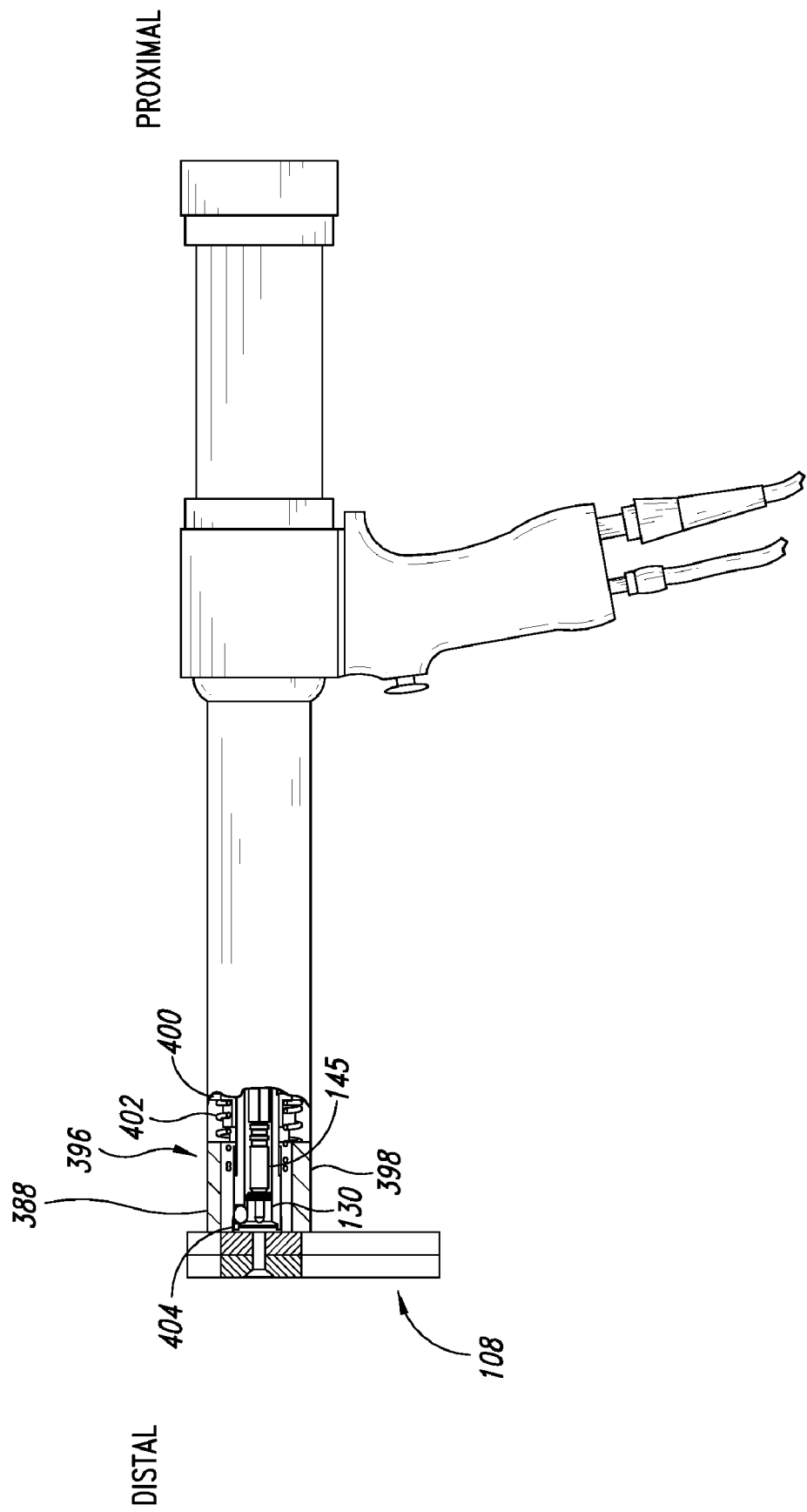
FIG. 13 is an elevational view of the installation apparatus installing an expandable faster assembly in a workpiece. A puller unit of the installation apparatus is shown partially cut-away.

Referring to FIG. 13, the swaging assembly 396 includes an outer housing 398, an actuating device 400, and a biasing member 402 between the outer housing 398 and the actuating device 400. The actuating device 400 is moved through the outer housing 398 towards the workpiece 108 to cause a swaging mechanism 404 to swage the collar 130. The outer housing 398 is held against the workpiece 108 as the puller unit 386 pulls on the inner member 145 to remove the detachable section 340.

Figure 14:
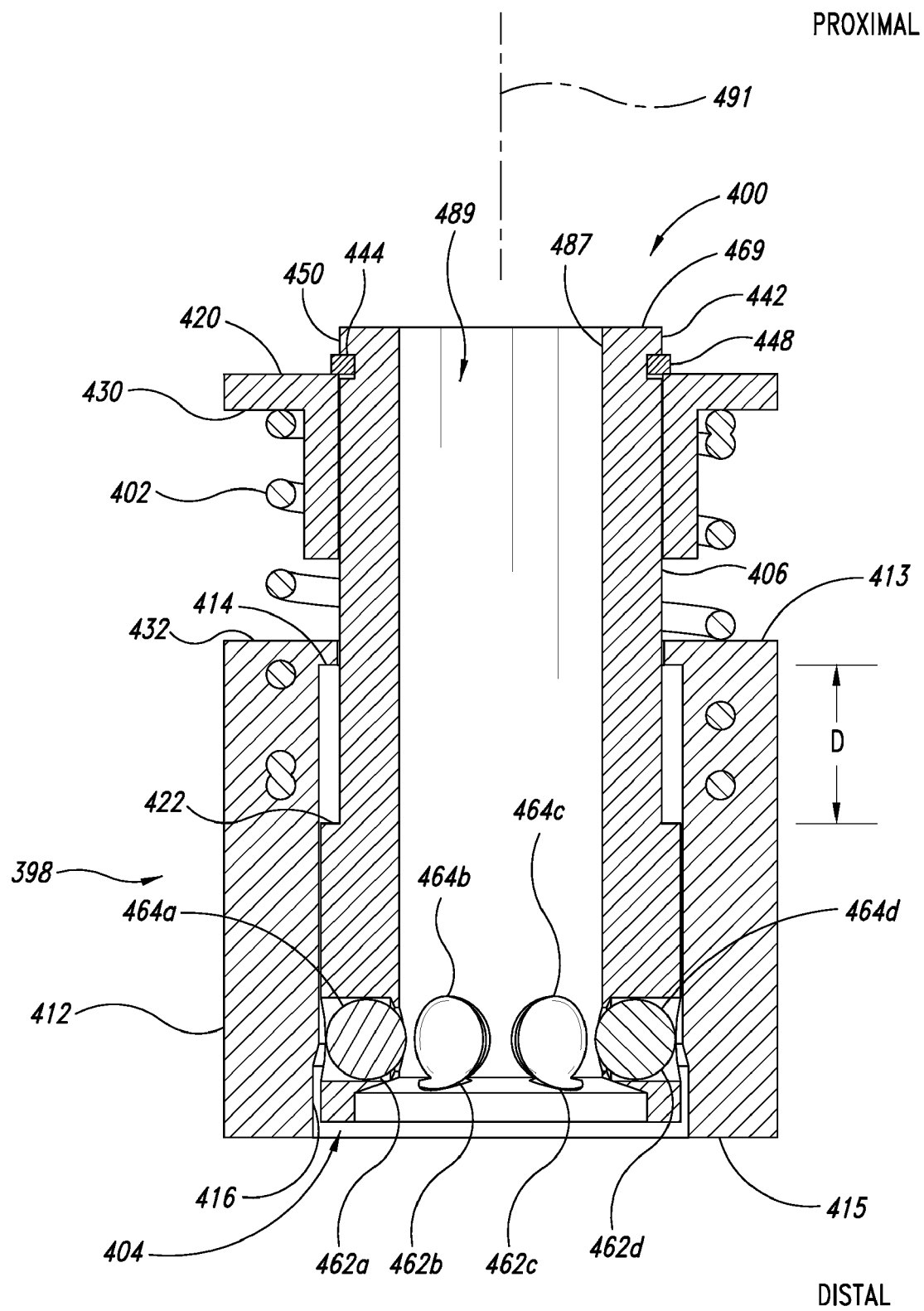
FIG. 14 is a cross-sectional view of a swaging assembly, in accordance with one embodiment.

FIG. 14 shows the outer housing 398 having a generally tubular main body 412, a first end 413, a second end 415, and a bore 416 extending between the first end 413 and the second end 415. The bore 416 is a longitudinally-extending passageway sized and dimensioned to closely surround the actuating device 400.

The biasing member 402 pushes on the housing 398 and a retainer 420, illustrated as a flange of the actuating device 400, to move the actuating device 400 in a proximal direction to move a shoulder 422 of the actuating device 400 against a shoulder 414 of the outer housing 398. The illustrated biasing member 402 is captured between a face 430 of the retainer 420 and an opposing face 432 of the outer housing 398. The biasing member 402 can include, without limitation, one or more springs (e.g., helical springs, conical springs, and the like). In some embodiments, the biasing member 402 is a round wire helical compression spring surrounding a sleeve 406 of the device 400. Although the embodiments illustrated herein show the biasing member 402 as a spring, it is understood that other mechanical devices known in the art that are capable of exerting a force can be used in place of the mechanical spring.

The sleeve 406 is closely received by the outer housing 398 and includes the shoulder 422. An inner surface 487 of the sleeve 406 defines a passageway 489. In the illustrated embodiment, the sleeve 406 is movable between a proximal position (e.g., when the shoulder 422 bears against the shoulder 414) and a distal position (illustrated in FIG. 14). A distance of travel D of the actuating device 400 can be selected based on the dimensions of the outer housing 398 and the sleeve 406.

The retainer 420 is coupled to an exterior surface 442 of the sleeve 406. A stop 448 can limit, minimize, or substantially prevent relative movement between the retainer 420 and the sleeve 406. The stop 448 of FIG. 14 is a ring that is at least partially disposed within an annular recess 444 at a proximal end 450 of the sleeve 406.

The swaging mechanism 404 includes a plurality of swaging elements 462a, 462b, 462c, 462d (collectively 462). The swaging elements 462 can be generally similar to each other, and accordingly, the following description of one of the swaging elements applies equally to the others, unless indicated otherwise. The swaging elements 462 can be circumferentially spaced about the sleeve 406 and can protrude inwardly from the inner surface 487 into the passageway 489. In the illustrated embodiment, the swaging elements 462 are ball bearings, each positioned in a corresponding socket 464a, 464b, 464c, 464c (collectively 464) in a sidewall 469 of the sleeve 406. For example, the swaging element 462a can rotate freely within the complementary socket 464. The ball bearings 462 can be generally spherical bearings made, in whole or in part, of a hard material suitable for deforming collars.

The swaging mechanism 404 can include six swaging elements 462 spaced generally equally apart by about 30 degrees with respect to a longitudinal axis 491 of the actuating device 400. The number of the swaging elements 462 may be greater or less than the illustrated exemplary number depending on various design objectives. For example, the swaging mechanism 404 can have more than six swaging elements 462 to increase the number of contact points created during the swaging process.

FIGS. 15-22 illustrate one method of installing the fastener assembly 100. Generally, the expandable outer member 140 is positioned in the opening 155. The inner member 145 is inserted into the expandable outer member 140. The collar 130 is moved over the outer member 140 such that the workpiece 108 is between the collar 130 and the head 160 of the outer member 140. The outer member 140 is expanded into the workpiece 108 using the mandrel section 330 of the inner member 145. The collar 130 is fixed to the expanded outer member 140.

Figure 15:
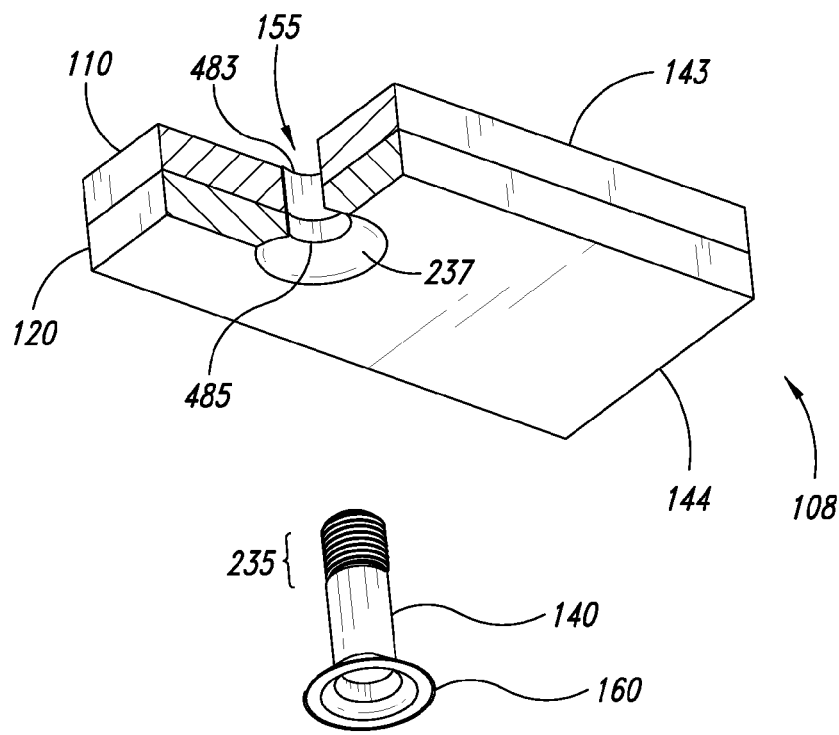
FIG. 15 is a pictorial view of an expandable outer member ready for installation in an opening of a workpiece, in accordance with one illustrated embodiment. The workpiece is shown cut-away.

Referring to FIG. 15, the outer member 140, in a pre-expanded state, is inserted into the opening 155 of the workpiece 108. A clearance fit, or other type of suitable fit, can be provided for convenient assembly. If the workpiece 108 is made of a composite material, a clearance fit can be provided to reduce, minimize, or substantially prevent damage to the workpiece 108 as the outer member 140 is placed within the opening 155. The opening 155 can closely receive the outer member 140 to reduce the amount of expansion required to install the outer member 140.

In the illustrated embodiment, the outer member 140 on the second side 144 of the workpiece 108 is moved sequentially through the first and second panels 120, 110. When the head 160 is seated in the countersink 237, the coupling section 235 protrudes from the first side 143 of the workpiece 108. In some embodiments, a substantial portion of the coupling section 235 extends outwardly from the opening 155. The illustrated coupling section 235 is spaced apart from the opening 155.

Figure 16:
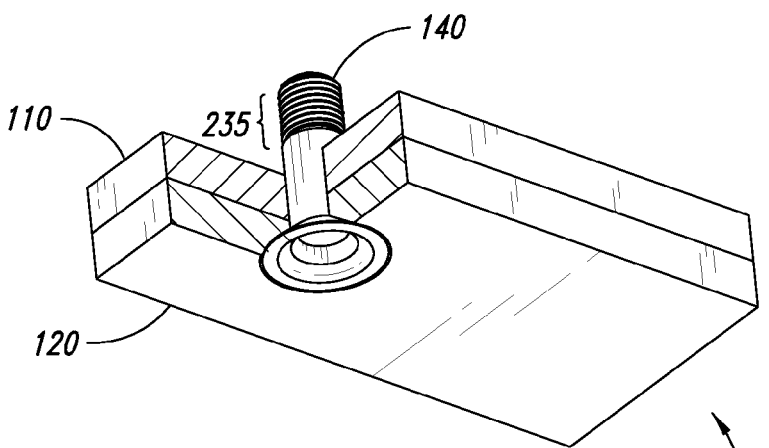
FIG. 16 is a pictorial view of an inner member spaced from an expandable outer member in a hole of a workpiece. The workpiece is shown cut away.
Figure 16:
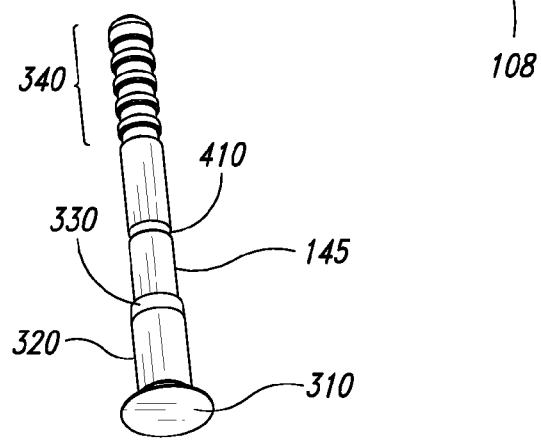

FIG. 16 shows the outer member 140 positioned in the opening 155 and ready to receive the inner member 145. The detachable section 340 of the inner member 145 is inserted into and advanced through the passageway 260 of the outer member 140 until at least a portion of the detachable section 340 projects outwardly from the inner member 140.

Figure 17:
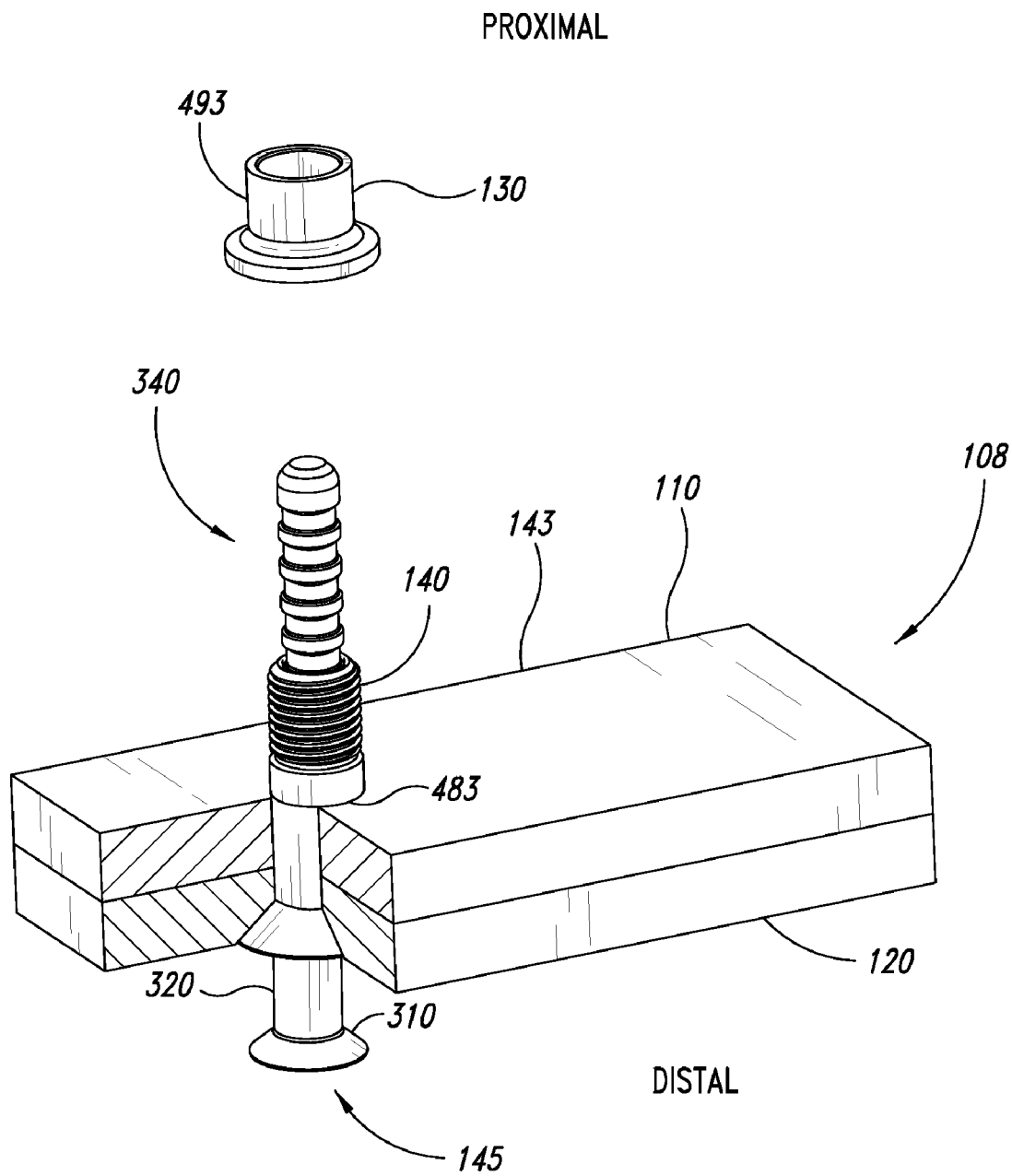
FIG. 17 is a pictorial view of a deformable collar ready for placement over an expandable outer member assembled with an inner member. The workpiece is shown cut away.

As shown in FIG. 17, the collar 130 can be positioned on the first side 143 of the workpiece 108. The collar 130 can be moved over the detachable section 340 and the outer member 140 such that the collar 130 rests against the workpiece 108. The collar 130 surrounds at least a portion of the coupling section 235.

Figure 18:
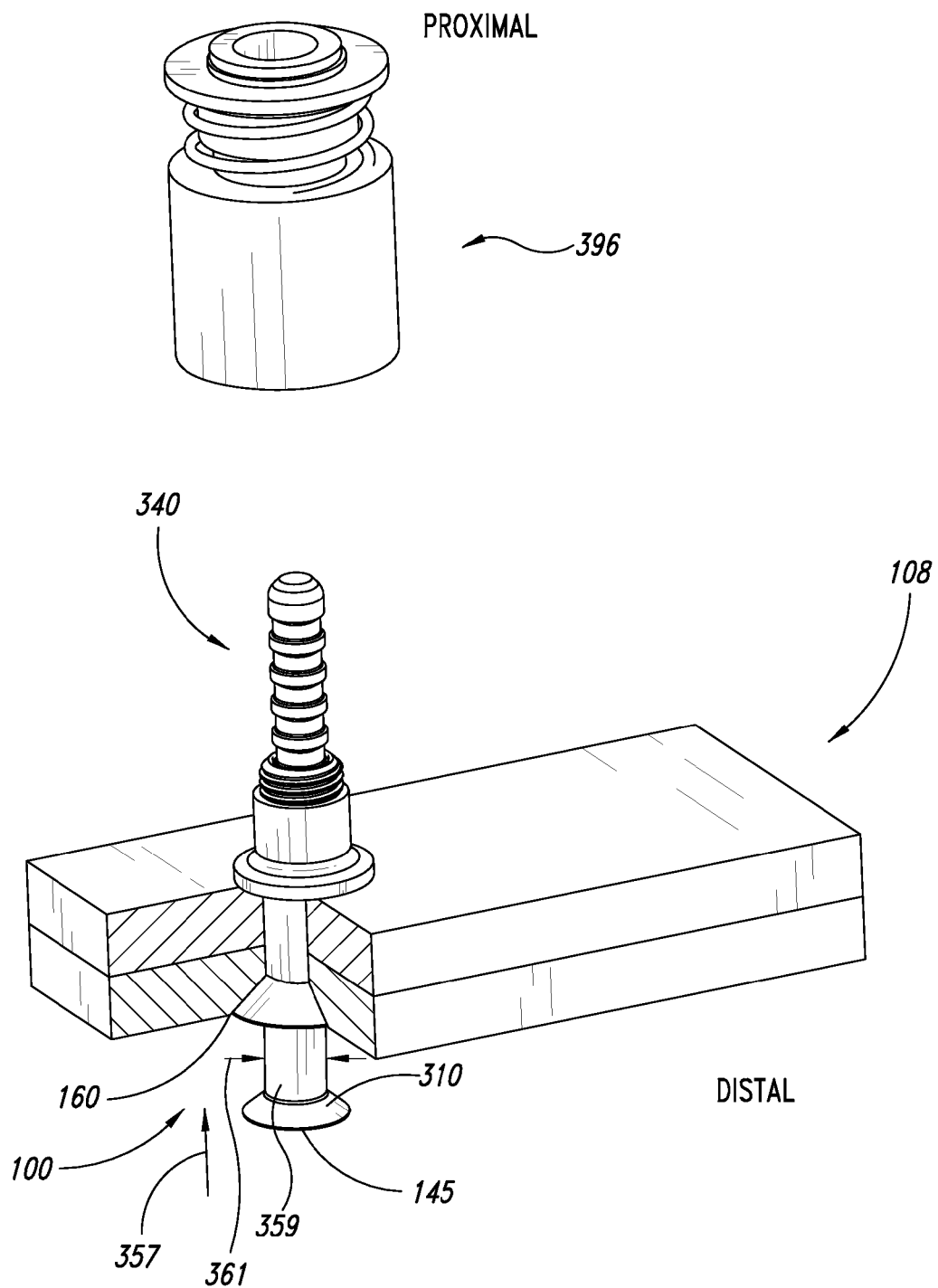
FIG. 18 is a pictorial view of a swaging assembly ready for installing an assembled fastener assembly. The workpiece is shown cut away.

FIG. 18 shows the swaging assembly 396 ready to receive the assembled fastener assembly 100 in an unexpanded state. A puller unit (e.g., the puller unit 388 illustrated in FIG. 12) can be coupled to the detachable section 340 protruding outwardly from the collar 130. The puller unit is activated to pull the inner member 145 proximally through the outer member 140 (indicated by the arrow 357 of FIG. 18). The mandrel section 330 expands the outer member 140 as it passes through the outer member 140 and the stem 320 props the expanded portion 213 of the outer member 140 to limit, minimize, or substantially prevent contraction of the outer member 140. During this process, the workpiece 108 is pulled against the swaging assembly 396. As the head 310 seats in the head 160, the puller unit compresses the workpiece 108 between the collar 130 and the head 160.

When the mandrel section 330 moves through the outer member 140, the mandrel section 330 radially expands the outer member 140 from an initial configuration to an expanded configuration to cold work, the workpiece 108 to produce an interference fit with the workpiece 108, or the like. The outer member 140 can shield the inner surface 154 of the opening 155 to prevent, limit, or substantially eliminate damage to the workpiece 108. The wall thickness of the outer member 140 can be increased to increase shielding. The outer member 140 remains stationary with respect to the workpiece 108 as the tubular main body 250 is expanded. The outer member 140 can control stresses induced in the workpiece 108 throughout a portion or the entire thickness of the workpiece 108.

The outer surface 359 of the inner member 145 includes an outer perimeter 361 that is sized to be equal to (e.g., maximum tolerance conditions) or at least slightly smaller than the inner perimeter of the "radially expanded" outer member 140. This relative sizing allows the stem 320 to follow the mandrel section 330 into the expanded outer member 140 and to prop open the outer member 140. In some embodiments, the inner member 145 can be inserted into the outer member 140 without damaging an inner surface 263 of the outer member 140.

The relative sizing of the mandrel section 330 and the stem 320 can also permit the stem 320 to be passed into the radially expanded outer member 140 so that the outer member 140 can produce an interference fit with the inner member 145, which both supports and limits the radial contraction of the outer member 140. In some embodiments, elastically, radially spring back of radially-expanded outer member 140 produces a secure interference fit therewith to achieve desired clamp-up forces, even relatively large clamp-up forces.

The opening 155 can be expanded without compromising the structural integrity of the workpiece 108, even the free edges 483, 485 of the opening 155. Because the workpiece 108 is not exposed to any appreciable frictional forces during the expansion process, damage (e.g., delamination) of the one or both of the panels 110, 120 can be kept at or below a desired level, even in material proximate to the free edges 483, 485 shown in FIG. 15. The composition, dimensions, and configuration of the outer member 140 can be selected to minimize, limit, or substantially prevent undesired stresses (e.g., shear stresses) in the workpiece 108 while producing desired stresses (e.g., compressive stresses) in the workpiece 108.

Figure 19:
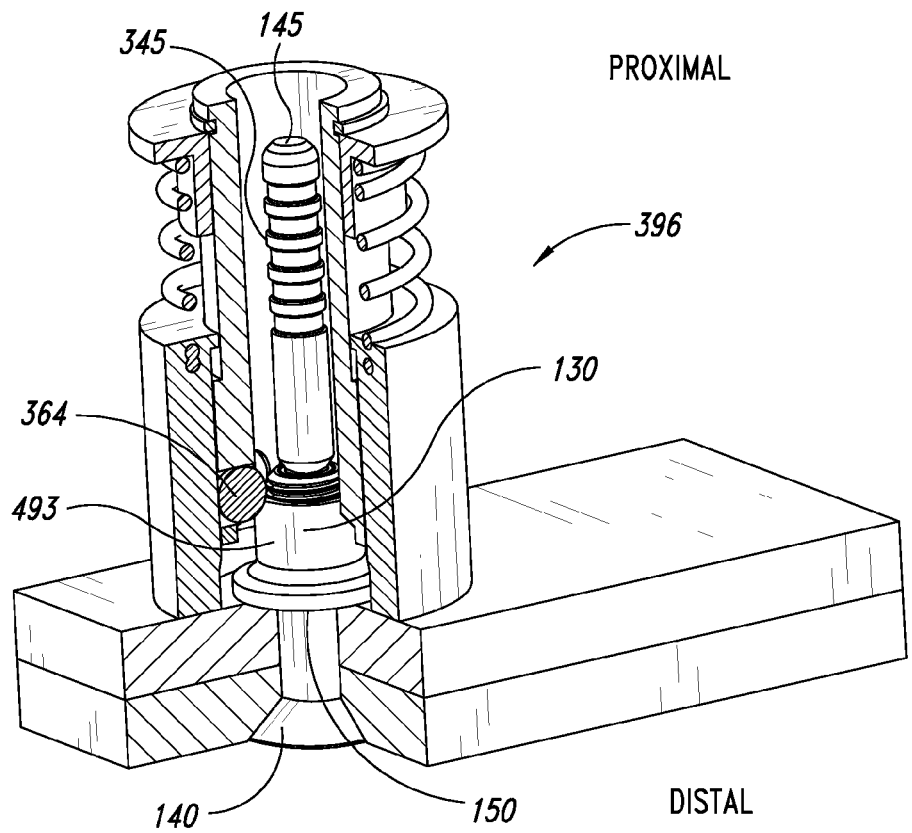
FIG. 19 is a cut-away view of a swaging assembly ready to deform a collar of an expandable fastener assembly, according to one illustrated embodiment.

Referring to FIG. 19, an outer surface 493 of the collar 130 is a generally cylindrical surface. The actuating device 400 contacts and bears against the outer surface 493. The actuating device 400 is moved distally towards the flange 150 of the collar 130. A gripping mechanism of the puller unit pulls on the inner member 145 to keep the puller unit against the workpiece 108 while the swaging elements 462 roll along the outer surfaced 493.

As the swaging elements 462 roll along the outer surface 493, the swaging elements 462 compress the collar 130 against the expanded outer member 140. The swaging elements 462 cooperate to radially displace the collar 130 inwardly so as to press the inner surface 217 of the collar 130 against the locking features 220. Each swaging element 462 can produce a longitudinally-extending swage groove. The grooves can have an arcuate cross-section, including a generally U-shaped cross-section, or other suitable cross-sections. As used herein, the term "groove" includes, but is not limited to, a generally long narrow furrow or channel. In some embodiments, the swaging elements 462 can push material of the collar 130 towards the workpiece 108 to increase the clamp-up forces. Each of the swaging elements 462 can cause a flow of material ahead of the interface between the swaging elements 262 and the collar 130. This flow of material can be pushed towards the flange 150 and results in significantly increased clamp-up forces.

Figure 20:
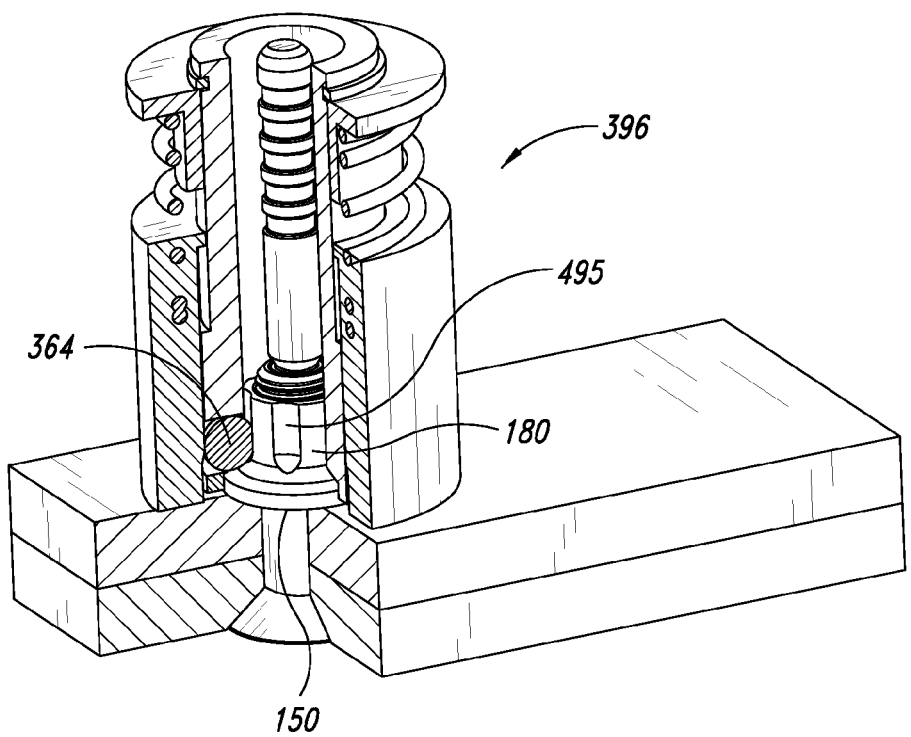
FIG. 20 is a cut-away view of the swaging assembly of FIG. 19 after deforming the collar, according to one illustrated embodiment.

FIG. 20 shows a plurality of grooves 495 circumferentially spaced from one another about the collar 130. The depths and widths of the grooves 495 can be increased by increasing the compressive forces applied by the swaging elements 462. The illustrated grooves 495 extend generally longitudinally along the collar 130. The grooves 495 can extend along most of the longitudinal length of the main body 180 to lock a substantially portion of the longitudinal length of the collar 130 to the outer member 140.

Figure 21:
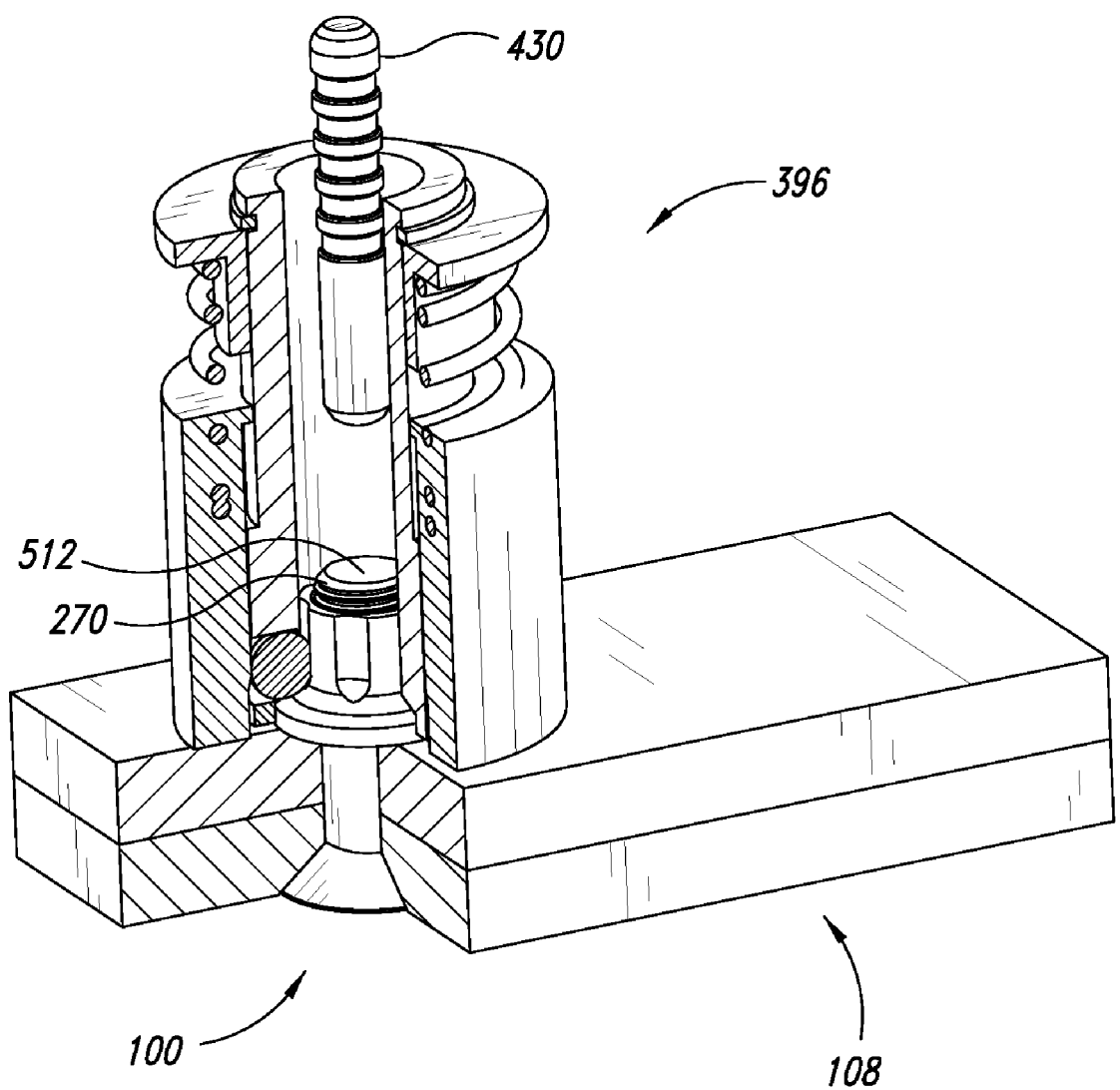
FIG. 21 is a cut-away view of the swaging assembly after breaking apart the inner member, according to one illustrated embodiment.

At full stroke, the swaging elements 462 are proximate the flange 150. After completing the swaging process, the puller unit can break off the exposed detachable section 430. A sufficient axial load can be applied to the inner member 145 to fracture the inner member 145 at or near the decoupling feature 350. FIG. 21 shows the inner member 145 after it is broken. A fracture surface 512 of the inner member 145 can be flush or adjacent to the end 270 of the member 140.

Figure 22:
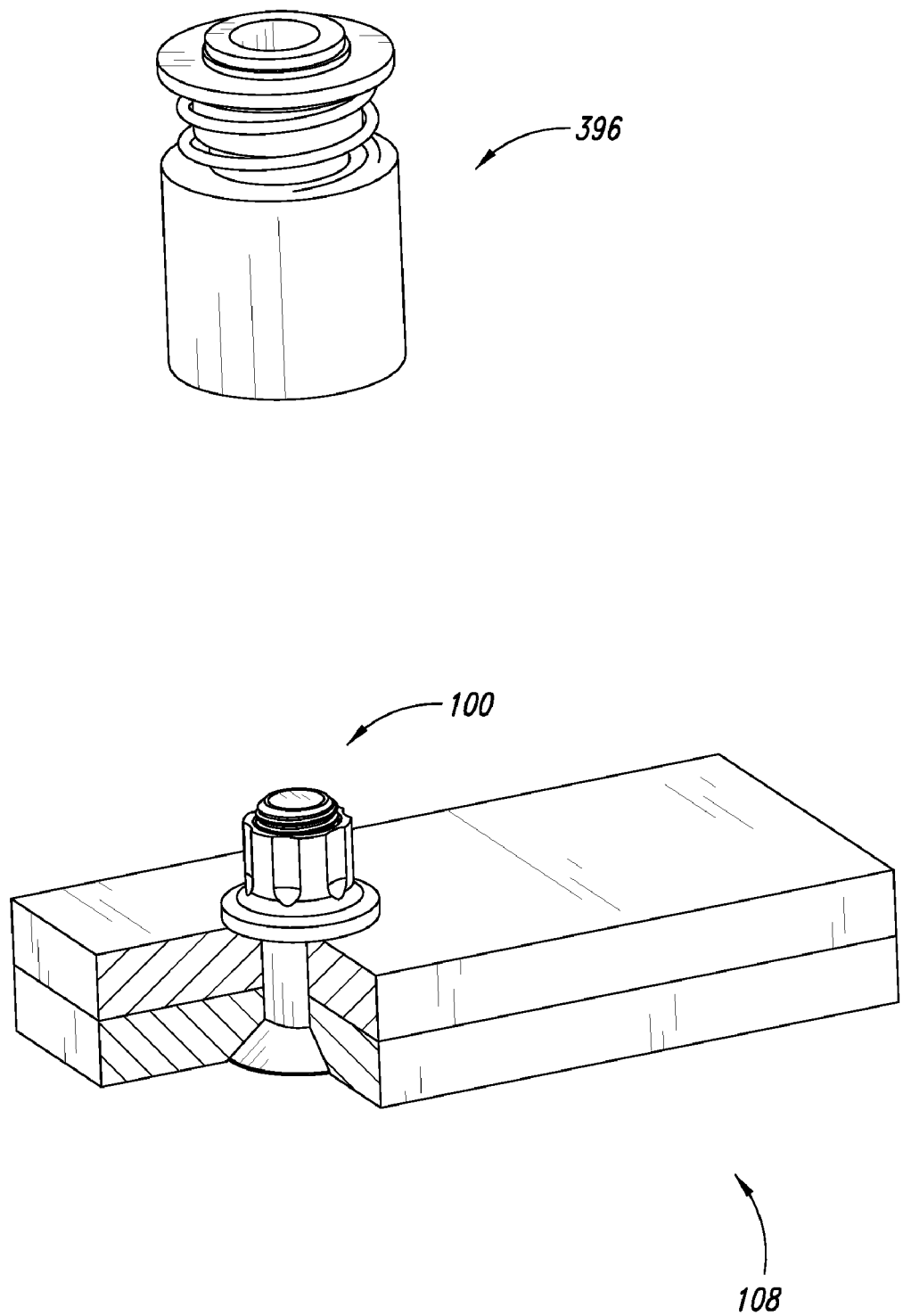
FIG. 22 shows the swaging assembly separated from the installed fastener assembly, according to one illustrated embodiment.

FIG. 22 shows the installed fastener assembly 100 and the swaging assembly 396 separated from the assembly 100. The swaging assembly 396 can be separated from the installed fastener assembly 100 after the detachable section 340 is removed.

The outer member 140 can contribute to the clamp-up of the workpiece 108, along with the swaged collar 130, to enhance performance (e.g., improve conductivity) and may result in some compliance that inhibits or precludes failure of the fastener head 160 in single shear loading conditions. The illustrated fastener assembly 100 can also be conveniently dissembled. When the inner member 145 is removed, the outer member 140 can spring back (e.g., contract inwardly) and, in some embodiments, can allow for the joint to be disassembled without damage to the workpieces 110, 120. The wall thickness of the outer member 140 can be sufficiently large to allow the inner member 145 to be slide out of the outer member 140 that remains generally stationary. In contrast, conventional thin-walled sleeve/bolt assemblies may come out together resulting in unwanted damage to workpiece, especially when the workpiece is made of a composite material.

The outer member 140 can have an outer diameter that is slightly less than 0.25 inches and a wall thickness that is equal to or greater than about 0.03 inches. Such an outer member 140 can be installed in a 0.25 inch diameter hole. The outer member 140 can be radially-expanded into the workpiece 108 to form an integral part of the fastener assembly 100. In some embodiments, the outer member 140 has a wall thickness of about 0.04 inches and is made, in whole or in part, of steel (e.g., stainless steel), titanium, or the like. The inner member 145 can be made of a relatively hard material, such as stainless steel, suitable for radially-expanding the outer member 140. The dimensions and configurations of the inner member 145 and outer member 140 can be selected based on the installation configuration.

The fastener assembly 100 can provide enhanced electrical conductivity through the workpiece, especially at joints of workpieces made of composite materials. The outer member 140 can insulate the workpiece 108 from the inner member 145. High clamp-up forces ensure that multi-component workpieces are held together during the service life of the workpiece. Various types of substances (e.g., lubricants) can be applied to the fastener assembly 100 to facilitate installation and/or enhance performance. For example, the outer member 140 and inner member 145 can be passivated and dry film lubed. The passivated surfaces can provide electrical insulation between the components of the fastener assembly 100. The dry film lube can reduce the forces required to install the fastener assembly 100.

Workpieces may comprise a wide range of different materials, including materials (e.g., composite materials), that are susceptible to damage due to high strains. Composite materials may include two or more materials with significantly different properties, such as physical properties (e.g., mechanical properties, electrical properties, etc.), chemical properties, or the like. For example, composite materials may include, without limitation, reinforcing elements (e.g., fibers, particles, and the like), fillers, binders, matrix, and the like. Wood, fiberglass, polymers, plastics, metals, ceramics, glass, or the like can be combined to produce one or both of the illustrated composite panels 110, 120 with properties that are different from the properties of its constituents individually. In some embodiments, the workpiece 108 can comprise a fiber-reinforced composite, particle-reinforced composite, laminate (e.g., a stack of laminas), or combinations thereof. The matrix of the reinforced composites can be made of metal, polymers, ceramics, and other suitable materials for encapsulating other reinforcement features. The laminates can be unidirectional laminates, cross-ply laminates, angle-ply laminates, symmetric laminates, and the like.

The fastener assembly 100 can be installed in the composite workpiece 108 while maintaining the integrity of the workpiece 108. The outer member 140, for example, can be easily inserted into the opening 155. The inner member 145 can expand the outer member 140 such that the expanded outer member 140 produces an interference fit with the workpiece 108. To minimize, limit, or substantially prevent damage to the material surrounding the opening 155, the amount of radial expansion can be below a threshold amount of expansion that would cause unwanted damage, such as micro-cracking, buckling of fibers, and the like, of the workpiece 108.

Composites may have relatively low strain capabilities as compared to metals. The fastener assembly 100 can produce compressive loading in the composite material surrounding the opening 155. If the compressive loading is too high, fibers in a fiber-reinforced composite material can buckle, which in turn affects the material's properties. Micro-buckling of fibers may significantly reduce the water resistance of the composite material because buckled fibers may cause micro-cracking of the matrix surrounding the fibers. Splitting due to Poisson's ratio effect, matrix yielding, fiber splitting, de-bonding (e.g., fiber de-bonding, interlaminate de-bonding, and the like), and other failure modes are often caused by compressive loading or high strains. Advantageously, the fastener assembly 100 can be installed using sufficiently low levels of strain to control the amount of damage, if any, to the workpiece 108. For example, the outer member 140 in an un-expanded state can be installed with a clearance fit or a slight interference fit, as well as other types of fits, until the inner member 145 expands the outer member 140. Advantageously, the fastener assembly 100 can be installed using sufficiently low levels of strain to control the amount of damage, if any, to the workpiece 108. The fastener assembly 100, for example, can be installed with a slight interference fit or other type of fit that keeps the fastener assembly 100 fixed to the workpiece 108. Outwardly directed compressive forces can be applied to the workpiece 108 without compromising the structural integrity of the workpiece 108.

By knowing the final dimensions of the installed fastener assembly, a desired amount of radial interference between the expanded outer member 140 and the inner member 145 may be selected. It is understood that the inner member 145, the outer member 140, and/or the opening 155 in the workpiece 108 may have generally circular cross-sections or non-circular cross-sections such that the amount of interference may need to be expressed with alternate language. It is generally understood that when components are assembled with an "interference fit," a contact pressure is present between the components after assembly.

Further, the installation can be accomplished with both the inner and outer members 140, 145 at substantially the same temperature. In some embodiments, the average temperature of the inner member 140 can be less than about 10 degrees Celsius of the average temperature of outer member 145. In some embodiments, for example, the average temperature of the inner member 140 can be less than 5 degrees Celsius of the average temperature of outer member 145. This eliminates the need to freeze or heat one of the respective members, which reduces manufacturing time and costs. Thermal processes can often lead to the formation of a condensate, which in turn leads to corrosion of the workpiece 108.

Figure 23:
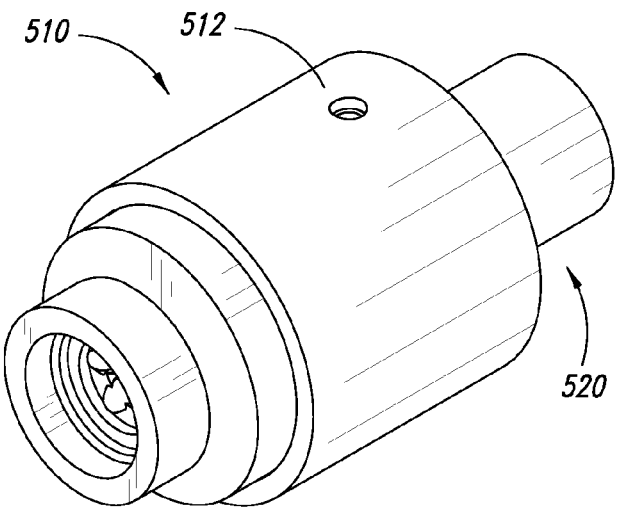
FIG. 23 is a pictorial view of a swaging assembly, according to one illustrated embodiment.
Figure 24:
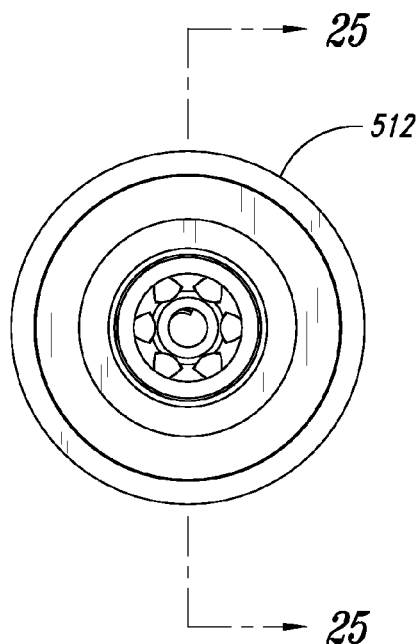
FIG. 24 is a bottom view of the swaging assembly of FIG. 23.
Figure 25:
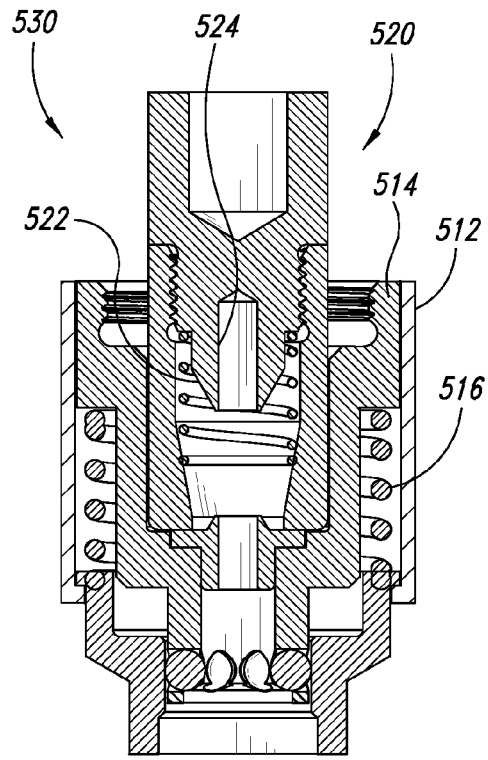
FIG. 25 is a cross-sectional view taken along a line 25-25 of FIG. 24. A jaw assembly is shown removed.

Other types of swaging assemblies can be used to install expandable fastener assemblies. FIG. 23-25 show a swaging assembly 510 that includes a multi-piece outer housing 512, a restraint 514, and a biasing member 576 between the outer housing 512 and the restraint 514. A gripping mechanism 520 has a jaw 522 for gripping an inner member. The inner member can be inserted into a bore 524 of the gripping mechanism 522. An actuation assembly 530 includes coupling features 540, illustrated as internal threads, for coupling to a puller unit.

Figure 26:
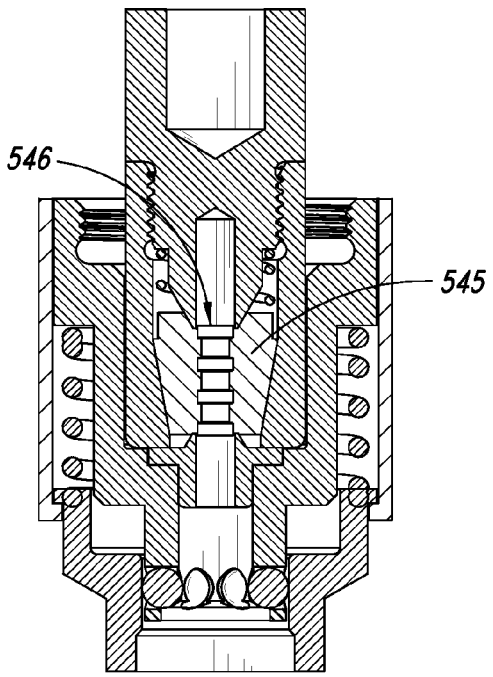
FIG. 26 is a cross-sectional view of the swaging assembly taken along a line 25-25 of FIG. 24, wherein the swaging assembly includes a jaw assembly.

FIG. 26 shows the swaging assembly 510 with a jaw assembly 545. The jaw assembly 545 includes interior engagement region 546 configured to engage the engagement region of an inner member, such as the engagement region 342 discussed in connection with FIGS. 7-9. The illustrated engagement region 546 has a complementary shape to the engagement region 342 of the inner member 145. The jaw assembly 545 is moveable between an open configuration for receiving the inner member 145 and an open configuration for releasing the detachable section 340 after breaking if off.

The various embodiments described above can be combined to provide further embodiments. All of the above U.S. patents, patent applications and publications referred to in this specification, as well as U.S. Pat. Nos. 3,566,662; 3,892,121; 4,187,708; 4,423,619; 4,425,780; 4,471,643; 4,524,600; 4,557,033; 4,809,420; 4,885,829; 4,934,170; 5,083,363; 5,096,349; 5,103,548; 5,127,254; 5,245,743; 5,305,627; 5,341,559; 5,380,136; 5,405,228; 5,433,100; 7,024,908; 7,100,264; and 7,375,277; U.S. Patent Publication Nos. 2005/0025601; 2007/0110541; 2007/0289351; 2007/0295050; 2008/0005887; 2008/0034831; and 2008/0066518; and International Application No. WO 2007/082077 are incorporated herein by reference. Aspects can be modified, if necessary or desired, to employ devices, features, elements (e.g., fasteners, bushings, nut plates, and other types of expandable members), and concepts of the various patents, applications, and publications to provide yet further embodiments. The fastener assemblies disclosed herein can be made, in whole or in part, of the materials (e.g., materials, coatings, liners, etc.) disclosed in the concepts of the various patents, applications, and publications to provide yet further embodiments From the foregoing it will be appreciated that, although specific embodiments of the invention have been described herein for purposes of illustration, various modifications may be made without deviating from the spirit and scope of the invention. Accordingly, the invention is not limited except as by the disclosed embodiments and the appended claims.

What is claimed is:

1. An installation, comprising:
a workpiece having an opening;
a swaged collar having a first end, a second end, and a main body extending between the first end and the second end, the main body including an inner surface defining a passageway;
an inner member having a narrow section, a propping section, and a mandrel section between the narrow section and the propping section; and
a radially-expanded outer member positioned in the opening of the workpiece and through which the inner member extends, the inner surface of the collar compressed against at least one locking feature of the expanded outer member to fix the collar and the outer member together, an outer surface of the outer member having a high interference fit with an inner surface of the opening in the workpiece, the propping section of the inner member positioned within the outer member to maintain the high interference fit between the outer member and the workpiece,
wherein the outer member includes a head and a tubular body, the tubular body includes a first portion that extends longitudinally in the opening of the workpiece and a second portion that extends longitudinally beyond the workpiece, the first portion of the tubular body is in the expanded state, the second portion of the tubular body is in the unexpanded state, the first portion of the tubular body includes a first internal diameter, the second portion of the tubular body includes a second internal diameter, and the first internal diameter is larger than the second internal diameter.

2. The installation of claim 1, wherein the outer member includes a head and a tubular body, wherein substantially all of a longitudinal length of a portion of the tubular body has the high interference fit with the workpiece within the opening.

3. The installation of claim 1, wherein the outer member is configured to substantially prevent shear loads to the workpiece.

4. The installation of claim 1, wherein the propping section maintains induced fatigue enhancing compressive stresses in the workpiece produced by the high interference fit between the outer member and the workpiece.

5. The installation of claim 1, wherein the swaged collar is translationally fixed and rotationally fixed with respect to the outer member.

6. The installation of claim 1, wherein the swaged collar includes a plurality of longitudinally-extending swage grooves on an exterior of the swaged collar.

7. The installation of claim 6, wherein each of the swage grooves has an arcuate cross-section.

8. The installation of claim 1, wherein the outer member is a hollow fastener fixed to the workpiece with an interference fit.

9. The installation of claim 1, wherein the workpiece includes a first member and a second member, the collar abuts the first member and a head of the outer member abuts the second member.

10. The installation of claim 9, wherein at least one of the first member and the second member is a panel made of a composite.

11. The installation of claim 1, wherein the workpiece includes a plurality of panels, at least one of the panels comprises a fiber-reinforced composite material and at least one of the panels comprises metal.

12. The installation of claim wherein the propping section of the inner member extends through the first portion of the tubular body, and the narrow section of the inner member extends through the second portion of the tubular body.

13. An installation, comprising:
a workpiece having an opening;
a swaged collar having a first end, a second end, and a main body extending between the first end and the second end, the main body including an inner surface defining a passageway;
an inner member having a narrow section with a first cross-sectional area that is transverse to a longitudinal direction of the inner member and that is constant in the longitudinal direction of the inner member, a propping section with a second constant cross-sectional area that is larger than the first cross-sectional area, that is transverse to the longitudinal direction of the inner member, and that is constant in the longitudinal direction of the inner member, and a mandrel section between the narrow section and the propping section, the mandrel section including a plurality of different cross-sectional areas transverse to the longitudinal direction along the longitudinal direction of the inner member; and
a radially-expanded outer member positioned in the opening of the workpiece, the inner member positioned in and extending through the outer member, the inner surface of the collar engaged with against at least one locking feature of the expanded outer member to fix the collar and the outer member together, the outer member including a head and a tubular body, substantially all of a first longitudinal length of a first portion of the tubular body within the opening surrounding the propping section of the inner member, and substantially all of a second longitudinal length of a second portion of the tubular body extending beyond the opening surrounding the narrow section of the inner member.

14. The installation of claim 13, wherein the swaged collar is translationally fixed and rotationally fixed with respect to the outer member.

15. The installation of claim 13, wherein the swaged collar includes a plurality of longitudinally-extending swage grooves on an exterior of the swaged collar.

16. The installation of claim 15, wherein each of the swage grooves has an arcuate cross-section.

17. The installation of claim 13, wherein the outer member is a hollow fastener fixed to the workpiece with an interference fit.

18. The installation of claim 13, wherein the workpiece includes a first member and a second member, the collar abuts the first member and a head of the outer member abuts the second member.

19. The installation of claim 18, wherein at least one of the first member and the second member is a panel made of a composite.

20. The installation of claim 13, wherein the workpiece includes a plurality of panels, at least one of the panels comprises a fiber-reinforced composite material and at least one of the panels comprises metal.

* * * * *

UNITED STATES PATENT AND TRADEMARK OFFICE
CERTIFICATE OF CORRECTION

PATENT NO.        : 8,312,606 B2
APPLICATION NO.   : 12/253141
DATED             : November 20, 2012
INVENTOR(S)       : Leonard Frederick Reid et al.

It is certified that error appears in the above-identified patent and that said Letters Patent is hereby corrected as shown below:

In the Claims:

Column 17, Line 20:
"12. The installation of claim wherein the propping section" should read, --12. The installation of claim 1 wherein the propping section--.

Signed and Sealed this
Second Day of July, 2013

Teresa Stanek Rea
*Acting Director of the United States Patent and Trademark Office*